US008982402B2

(12) United States Patent
Kawai

(10) Patent No.: US 8,982,402 B2
(45) Date of Patent: Mar. 17, 2015

(54) IMAGE FORMING SYSTEM AND IMAGE FORMING SYSTEM COMMUNICATION CONTROL METHOD

(71) Applicant: Konica Minolta, Inc., Tokyo (JP)

(72) Inventor: Atsushi Kawai, Aichi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/245,736

(22) Filed: Apr. 4, 2014

(65) Prior Publication Data

US 2014/0300930 A1 Oct. 9, 2014

(30) Foreign Application Priority Data

Apr. 5, 2013 (JP) ................................ 2013-079069

(51) Int. Cl.
*G06F 3/12* (2006.01)

(52) U.S. Cl.
CPC ............ *G06F 3/1205* (2013.01); *G06F 3/1237* (2013.01); *G06F 3/1284* (2013.01)
USPC ........ 358/1.15; 358/530; 358/1.13; 358/1.14; 358/442; 370/254; 370/310; 710/104; 710/38

(58) Field of Classification Search
None
See application file for complete search history.

(56) References Cited

U.S. PATENT DOCUMENTS

| | | | | |
|---|---|---|---|---|
| 5,079,624 | A * | 1/1992 | Sasuga et al. | 358/530 |
| 5,805,171 | A * | 9/1998 | St. Clair et al. | 345/619 |
| 5,805,678 | A * | 9/1998 | Okamoto et al. | 379/100.01 |
| 6,356,354 | B1 * | 3/2002 | Prenn et al. | 358/1.14 |
| 6,577,623 | B1 * | 6/2003 | Kawai et al. | 370/354 |
| 7,027,190 | B2 * | 4/2006 | Namizuka et al. | 358/3.1 |
| 8,478,917 | B2 * | 7/2013 | Scott et al. | 710/104 |
| 2004/0233466 | A1 * | 11/2004 | Shindoh et al. | 358/1.13 |
| 2009/0059814 | A1 * | 3/2009 | Nixon et al. | 370/254 |
| 2009/0182801 | A1 * | 7/2009 | Miyazaki et al. | 709/201 |
| 2014/0173144 | A1 * | 6/2014 | Kobashi | 710/38 |

FOREIGN PATENT DOCUMENTS

| | | | |
|---|---|---|---|
| JP | 2003-112464 | A | 4/2003 |
| JP | 2006-350961 | A | 12/2006 |
| JP | 2009-271761 | A | 11/2009 |

OTHER PUBLICATIONS

Patent Abstracts of Japan, Publication No. 2006-350961 dated Dec. 28, 2006 (1 page).

(Continued)

*Primary Examiner* — Ashish K Thomas
(74) *Attorney, Agent, or Firm* — Osha Liang LLP

(57) ABSTRACT

An image forming system includes an upstream apparatus for forming an image on a sheet, a downstream apparatus for applying sheet processing to the sheet on which the image is formed by the upstream apparatus, an exclusive communication path for communicating information which is necessary only for an operation of each apparatus in a state in which a communication partner is fixed between the upstream apparatus and the downstream apparatus, and a general-purpose communication path for communicating information in a state in which a communication partner is selectable between the upstream apparatus and the downstream apparatus. The exclusive communication path and the general-purpose communication path communicate information which respective paths can handle by sharing the information with each other.

24 Claims, 18 Drawing Sheets

(56) References Cited

OTHER PUBLICATIONS

Patent Abstracts of Japan, Publication No. 2009-271761 dated Nov. 19, 2009 (1 page).

Patent Abstracts of Japan, Publication No. 2003-112464 dated Apr. 15, 2003 (1 page).

* cited by examiner

FIG. 6

| direction | serial signal name | Remarks | parallel correspondence |
|---|---|---|---|
| upstream ↓ downstream | operation start signal | indicating an operation start | possible |
| | discharge info. | sheet reaches an discharge roller | possible |
| | finishing | timing of sheet processing | possible |
| | stop info. | finish of the job | possible |
| | discharge place | machine and tray of discharge place | impossible |
| | sheet processing | content of sheet processing | impossible |
| | sheet size | sheet size | impossible |
| | sheet adjustment | information of sheet adjustment | impossible |
| | sheet type info. | sheet type information | impossible |
| | sheet weight info. | sheet weight information | impossible |
| | sleep switchover | sleep switchover / sleep release | impossible |
| | ... | ... | |
| downstream ↓ upstream | ready information | possible in sheet processing apparatus | possible |
| | page discharge info. | receive in sheet processing apparatus | possible |
| | bundle discharge info. | bundle discharge succeeded | possible |
| | wait info. | time required for post-processing | partially possible |
| | jam notification | jam occurs (cause info. included) | partially possible |
| | door open notification | door opend(position info. included) | partially possible |
| | alarm notification | no paper, component replacement | partially possible |
| | sleep switchover | sleep switchover / sleep release | impossible |
| | ... | ... | |

FIG. 7

| ID | parallel signal name | contents of control | |
|---|---|---|---|
| | | ON | OFF |
| C0 | operation start/stop | OFF to ON : start command | ON to OFF: stop command |
| C1 | sheet process type | sheet process execute | discharge to the downstream |
| C2 | sheet discharge signal | slips out of an upstream roller | --- |
| C3 | part separation signal | timing of sheet processing | --- |
| C4 | body status signal | main machine turn on | main machine turn off or power save |
| R0 | online | possible in sheet processing | impossible in sheet processing |
| R1 | abnormalities/jam | abnormal circumstances | normal status |
| R2 | alarm notification | notify of alarm(paper full) | normal status |
| R3 | discharge signal(ON/OFF) | notification of sheet receive | --- |
| R4 | bundle discharge(ON/OFF) | bundle discharge succeeded | --- |

FIG. 8

| direction | LAN signal | remarks | serial correspondence / parallel correspondence |
|---|---|---|---|
| upstream image forming apparatus ↓ downstream | sheet process mode | sheet process specification | possible / impossible |
| | discharge speed info. | sheet speed from upstream to downstream | possible / impossible |
| | sheet size info. | sheet size (matching, position, jam detect) | possible / impossible |
| | sheet weight info. | sheet weight (optimal processing) | possible / impossible |
| | discharge position info. | discharge position (machine, tray) information | possible / impossible |
| | settings parameter info. | Fine tuning of a result (binding, punch) | impossible / impossible |
| | sleep switchover | sleep switchover / sleep release | possible / impossible |
| | --- | --- | |
| downstream ↓ upstream image forming apparatus | page position | page position, page order, up/down | impossible / impossible |
| | possible sheet info. | maximum size and minimum size | impossible / impossible |
| | possible sheet weight | maximm weight and minimum weight | impossible / impossible |
| | jam detailed info. | jam cause, jam position, remain sheet | possible / impossible |
| | door open detailed info. | door open existence, door open position | possible / impossible |
| | alarm detailed info. | alarm detailed information | possible / impossible |
| | sleep switchover | sleep switchover / sleep release | possible / impossible |
| | --- | --- | |

IMAGE FORMING SYSTEM AND IMAGE FORMING SYSTEM COMMUNICATION CONTROL METHOD

This application claims priority under 35 U.S.C. §119 to Japanese Patent Application No. 2013-79069 filed on Apr. 5, 2013, the entire disclosure of which is incorporated herein by reference in its entirety.

BACKGROUND OF THE INVENTION

1. Field of the Invention

This invention relates to improvement of a communication control method in an image forming system in which a sheet processing apparatus of a different type is connected with an image forming apparatus.

2. Description of Related Art

The image forming apparatus can be used as a printing apparatus because various types of bookbinding processing become possible by being connected with various types of sheet processing apparatuses to form the image forming system. For example, saddle stitching bookbinding can be conducted by applying a stapling process to the crease portion of the sheet bundle made by folding sheets at the center of the sheets. The square back processing which produces a condition similar to the un-sewn binding is possible by applying pressure to the spine portion of a saddle stitched sheet bundle with a roller or the like and by forming a crease at the corner to produce the spine portion.

As a pre-processing to make such a crease, a line is made by using a line-making device called by the name of a creaser to apply a line-making process at the place where a crease is to be produced. The performance of the folding process after the line-making process has an advantage to prevent the crease from swelling even if multiple sheets are gathered and folded. Further, by the line-making process before the folding process, there is another advantage to prevent a toner from removing at the crease portion on the sheet convex surface during the folding process.

When various bookbinding processes like these are conducted, several sheet processing apparatuses having different functions are connected to the back of the image forming apparatus in series. Then a product subjected to bookbinding of the desired condition is obtained by applying the process to sheets on which images have been formed, by the sheet processing apparatus.

In an image forming system constituted by such an image forming apparatus and a sheet processing apparatus, it is necessary to transmit various control signals and sensor detection results between the apparatuses as well as to convey sheets from the top apparatus to the last apparatus. Normally an image forming apparatus and sheet processing apparatus are connected in series and the information is transmitted through a communication function of each apparatus.

As the contents of the communication, for using sufficient functions of various complicated sheet processes by the sheet processing apparatus or for operating in cooperation with each other at high productivity as a whole system, various types of and massive information such as a sheet discharge timing, a sheet type, an apparatus condition need to be transmitted without delay. Therefore, a high speed serial communication is used for communication between apparatuses to transmit massive data.

On the other hand, recently various sheet processing apparatuses are required. For this reason, it is becoming more difficult that only apparatuses of one manufacturer are used for sheet processing apparatuses arranged in order to cope with various processes. Accordingly, for the image forming system to be used as a printing apparatus, it is desirable that a sheet processing apparatus developed by another manufacturer (hereinafter, referred to as "third-vender sheet processing apparatus") can be connected with an image forming apparatus and a sheet processing apparatus which are main parts.

For methods to cope with these problems, various proposals are provided in Japanese Unexamined Patent Application Publication Nos. 2006-350961 and 2009-271761. In the Japanese Unexamined Patent Application Publication No. 2006-350961, minimum information needed by the sheet processing apparatus is transmitted by the parallel communication which has been used widely in general in the past to cope with the problems. The parallel communication is commonly used in the field of the printer and is a de facto standard, however only the minimum information for the operation can be transmitted because it is simple.

In the Japanese Unexamined Patent Application Publication No. 2009-271761, proposed is a technique for using adaptively an in-line finisher and a near-line finisher physically connected with an image forming apparatus in series. The in-line finisher is a sheet processing apparatus connected with the image forming apparatus in series. The near-line finisher is a sheet processing apparatus which is not physically connected with the image forming apparatus and is arranged in the vicinity. Therefore, a technique in which the print job is divided or converted according to which finisher is to be used, is proposed.

When a third-vender sheet processing apparatus is connected with an image forming apparatus, it is common that a genuine sheet processing apparatus is connected directly at the rear of the image forming apparatus and the third-vender sheet processing apparatus is connected at the rear of the genuine sheet processing apparatus. The genuine sheet processing apparatus is a sheet processing apparatus of the same manufacturer as the image forming apparatus. Four reasons are explained as follows.

Reason 1: The third-vender sheet processing apparatus tends to restrict the contents of possible sheet processes. For example, a certain third-vender sheet processing apparatus only conducts the discharge of saddle stitching booklets and cannot carry out the straight discharge which does not conduct the discharge of saddle stitching booklets. The third-vender sheet processing apparatus is often constructed to be connected as the final stage. Thus it is necessary to provide a genuine sheet processing apparatus having a function of a sub-tray discharge between the image forming apparatus and the third-vender sheet processing apparatus.

Reason 2: The speed of input conveyance into the third-vender sheet processing apparatus tends to be fixed. In this case, the speed adjustment is necessary in the previous stage. Thus, a genuine sheet processing apparatus whose speed is adjustable and which has, for example, a function of a relay unit or the like is necessary to be connected between the image forming apparatus and the third-vender sheet processing apparatus.

Reason 3: The height of the input position of the third-vender sheet processing apparatus tends to be unmatched with the discharge position of the image forming apparatus. Thus it is necessary to provide a genuine sheet processing apparatus whose heights of input and output positions are adjustable between the image forming apparatus and the third-vender sheet processing apparatus.

Reason 4: Only one sheet processing apparatus can be connected directly after the image forming apparatus regardless of whether it is the third-vender sheet processing apparatus or the genuine sheet processing apparatus. Thus even if an interface for the third-vender sheet processing apparatus (for example, the parallel interface having high versatility) is provided on the image forming apparatus, when a genuine sheet processing apparatus is connected with the image forming apparatus with the serial interface, which occupies the majority of the use methods, the parallel interface becomes useless.

Because of the above four reasons, it becomes necessary that for example, a genuine sheet processing apparatus for adjusting the conveyance speed and a genuine sheet processing apparatus for securing a discharge on a sub-tray need to be connected between an image forming apparatus and a third-vender sheet processing apparatus.

In this case, the connection is made as follows. The image forming apparatus and the genuine sheet processing apparatus are connected so that information is transmitted by the serial communication between them. When multiple genuine sheet processing apparatuses exist, they are connected so that information is transmitted between a genuine sheet processing apparatus and a genuine sheet processing apparatus through the serial communication. The genuine sheet processing apparatus and third-vender sheet processing apparatus are connected so that information is transmitted through the parallel communication.

When the connection is arranged for communication as described above, the following problems newly occur.

Problem 1: Detailed information regarding the sheet processing, for example, information on a sheet length can be transmitted because assignment of information is possible when the serial communication is used. However, when the parallel communication is used, detailed information regarding sheet processing or the like cannot be assigned and cannot be transmitted. Thus an operation of mode setting is necessary between the apparatuses in advance before the start of operation.

Problem 2: Detailed information regarding apparatus operation conditions, for example, information on positions or contents of the jam can be transmitted at the time of occurrence of the jam when the serial communication is used. However, detailed information regarding an apparatus operation condition cannot be transmitted through the parallel communication. Therefore, information on occurrence of some abnormality in the third-vender sheet processing apparatus is transmitted. However, to know the detailed contents of the abnormality which has occurred, the operator needs to see the operation panel of the third-vender sheet processing apparatus.

Problem 3: The imposition information or prohibition rule information of the third-vender sheet processing apparatus cannot be transmitted to the image forming apparatus by the parallel communication. For this reason, the mode setting based on the third-vender sheet processing apparatus need to be conducted on the image forming apparatus side before the start of operation.

Problem 4: Many third-vender sheet processing apparatuses are structured to be used not only as an in-line finisher but also as a near-line finisher. However, under conditions where the third-vender sheet processing apparatus is connected as an in-line finisher, when the power of the image forming apparatus is turned off, the power of the third-vender sheet processing apparatus is also turned off simultaneously. For this reason, the third-vender sheet processing apparatus cannot be used independently as a near-line finisher.

As described above, a problem of worsening the usage occurs when the third-vender sheet processing apparatus is connected to an image forming apparatus. Though the above specific examples shows that the third-vender sheet processing apparatus transmits information through the parallel communication and the image forming apparatus and the genuine sheet processing apparatus transmit information by the serial communication, the situation is not limited to these. For example, when an image forming apparatus and a genuine sheet processing apparatus transmit information through a high-speed serial communication or the third-vender sheet processing apparatus transmits information through a low-speed serial communication, problems similar to the above-described ones can occur. Further, when an image forming apparatus and a genuine sheet processing apparatus transmit information by a serial communication which can deal with various data and a third-vender sheet processing apparatus transmits information by a serial communication which deal with minimum data, problems similar to the above-described ones can occur.

In the above description, "information cannot be transmitted" includes not only the case where information cannot be transmitted because of difference of communication protocols, but also the case where amount of assigned commands or data is small because the defined information contents are restricted. Similarly, "information cannot be transmitted" includes the case where precision or the number of digits of numerical value of the handled information is different. Further similarly "information cannot be transmitted" includes the case where the communication of the sheet processing is not at an appropriate timing because the communication speed is low.

Further in the above description, though specific examples of third-vender sheet processing apparatus are described, it is not restricted to them. For example, even in the case of products manufactured by the same manufactures, when a high-performance apparatus in which various functions including a communication function is enlarged and a low-performance apparatus in which various functions including a communication function is restricted are connected, there is probability of occurrence of the similar problems.

That is to say, to an image forming apparatus as an upstream apparatus, an apparatus of a different type whose information communication is restricted due to the communication (third-vender sheet processing apparatus or sheet processing apparatus of the same manufacturer but of a different type) is connected as the downstream apparatus, it has been made clear that various types of malfunctioning occur.

The present invention is achieved in view of these problems, and has an objective to provide an image forming system and an image forming system communication control method which can improve the operation conditions without generating restrictions in the image forming system in which an apparatus of a different type is connected as a downstream apparatus.

The present invention is achieved in view of these problems, and has an objective to provide an image forming system and an image forming system communication control method which allows the downstream apparatus to operate alone independently of the upstream apparatus without operational restrictions in the image forming system in which an apparatus of a different type is connected as a downstream apparatus.

SUMMARY OF THE INVENTION (1) An image forming system reflecting one aspect of the present invention is composed of the following:

an upstream apparatus for forming an image on a sheet;

a downstream apparatus for applying sheet processing to the sheet on which the image is formed by the upstream apparatus;

an exclusive communication path for communicating information which is necessary only for an operation of each apparatus in a state in which a communication partner is fixed between the upstream apparatus and the downstream apparatus; and a general-purpose communication path for communicating information in a state in which a communication partner is selectable between the upstream apparatus and the downstream apparatus;

wherein the upstream apparatus and the downstream apparatus communicate the information by using a communication path which is the exclusive communication path or the general-purpose communication path and which can handle the information to be communicated.

(2) In the above (1), it is desirable that the general-purpose communication path is configured to be capable of communicating information with an apparatus other than the upstream apparatus and the downstream apparatus when the apparatus is connected with the path, as well as communicating information which is necessary for operations of the upstream apparatus and the downstream apparatus.

(3) In the above (1) to (2), it is desirable that the upstream apparatus includes an image forming apparatus which forms an image on a sheet, and a sheet processing apparatus which applies sheet processing to the sheet on which the image is formed by the image forming apparatus and which is connected with the downstream apparatus as a preceding stage of the downstream apparatus. It is desirable that the exclusive communication path includes a first exclusive communication path for communicating between the image forming apparatus and the sheet processing apparatus, and a second exclusive communication path for communicating between the sheet processing apparatus and the downstream apparatus. Further it is desirable that the general-purpose communication path is configured to communicate between the image forming apparatus and the downstream apparatus.

(4) In the above (3), information transmitted through the first exclusive communication path includes at least information which is transmitted through the second exclusive communication path. It is desirable that information transmitted through the general-purpose communication path includes information which is transmitted through the first exclusive communication path and further includes another information.

(5) In the above (3) to (4), it is desirable that the first exclusive communication path is configured to transmit information by a serial communication. It is desirable that the second exclusive communication path is configured to transmit information by a parallel communication.

(6) In the above (3) to (5), it is desirable that the sheet processing apparatus connected with the downstream apparatus through the second exclusive communication path has a function of converting information transmitted from the image forming apparatus through the first exclusive communication path into information to be transmitted through the second exclusive communication path to transmit it to the downstream apparatus and converting information transmitted from the downstream apparatus through the second exclusive communication path into information to be transmitted through the first exclusive communication path to transmit it to the image forming apparatus.

(7) In the above (3) to (6), the upstream apparatus includes a plurality of sheet processing apparatuses connected with one another in series, which are configured to include the sheet processing apparatus and which are connected with the image forming apparatus as a subsequent stage of the image forming apparatus. Then, it is desirable that the plurality of sheet processing apparatuses are connected with one another through the first exclusive communication path, and the second exclusive communication path connects a rearmost sheet processing apparatus of the plurality of sheet processing apparatuses and the downstream apparatus.

(8) In the above (3), the upstream apparatus is configured to include a plurality of sheet processing apparatuses connected with one another in series, which include the sheet processing apparatus and which are connected with the image forming apparatus as a subsequent stage of the image forming apparatus. Then it is desirable that when information on sheet processing is transmitted from the downstream apparatus to the image forming apparatus through the general-purpose communication path, the image forming apparatus transmits first processing information to the downstream apparatus through the general-purpose communication path, and transmits second processing information including the first processing information to the sheet processing apparatus through the first exclusive communication path, and a rearmost sheet processing apparatus of the plurality of sheet processing apparatuses transmits third processing information which is a part of the second processing information to the downstream apparatus through the second exclusive communication path.

(9) In the above (8), it is desirable that the first processing information is information related to a page imposition and a prohibition rule. It is desirable that the second processing information is information related to a sheet length, a conveyance speed, a basis weight, a discharge timing and a sheet processing timing. It is desirable that the third processing information is information related to a discharge and sheet processing.

(10) In the above (3), the following transmission of information is desirable when an abnormality occurs in the downstream apparatus. The downstream apparatus creates first abnormality information which indicates the abnormality of the downstream apparatus and transmits the first abnormality information to the sheet processing apparatus through the second exclusive communication path. The sheet processing apparatus creates second abnormality information based on a state of the downstream apparatus and the first abnormality information and transmits the second abnormal information to the image forming apparatus through the first exclusive communication path. The downstream apparatus creates third abnormality information based on a state of the abnormality of the downstream apparatus and transmits the third abnormality information to the image forming apparatus through the general-purpose communication path.

(11) In the above (10), it is desirable that the first abnormality information is information which indicates presence and absence of an abnormality occurrence. It is desirable that the second abnormality information is information which is created based on the first abnormality information and the state of the apparatus. It is desirable that the third abnormality information is information which includes information on the abnormality occurrence and a content of the abnormality.

(12) In the above (3), it is desirable that the upstream apparatus stops an operation by information on a stop instruction which includes an instruction of an operation stop, which is transmitted from an external apparatus connected with the upstream apparatus through the general-purpose communication path. It is desirable that the downstream apparatus continues an operation by information on sheet processing transmitted from the external apparatus through the general-purpose communication path.

BRIEF DESCRIPTION OF THE DRAWINGS

[FIG. 6] is an explanatory diagram illustrating a serial communication of an embodiment of the present invention.

[FIG. 7] is an explanatory diagram illustrating a parallel communication of an embodiment of the present invention.

[FIG. 8] is an explanatory diagram illustrating an exclusive communication of an embodiment of the present invention.

DETAILED DESCRIPTION OF THE PREFERRED EMBODIMENT

In the following paragraphs, one or more embodiments of the invention will be described by way of example and not limitation. It should be understood based on this disclosure that various other modifications can be made by those in the art based on these illustrated embodiments.

The details of forms for performing the present invention (hereinafter referred to as embodiments) are described referring to drawings

[Structure of the Image Forming System (1)]

Figure 1:
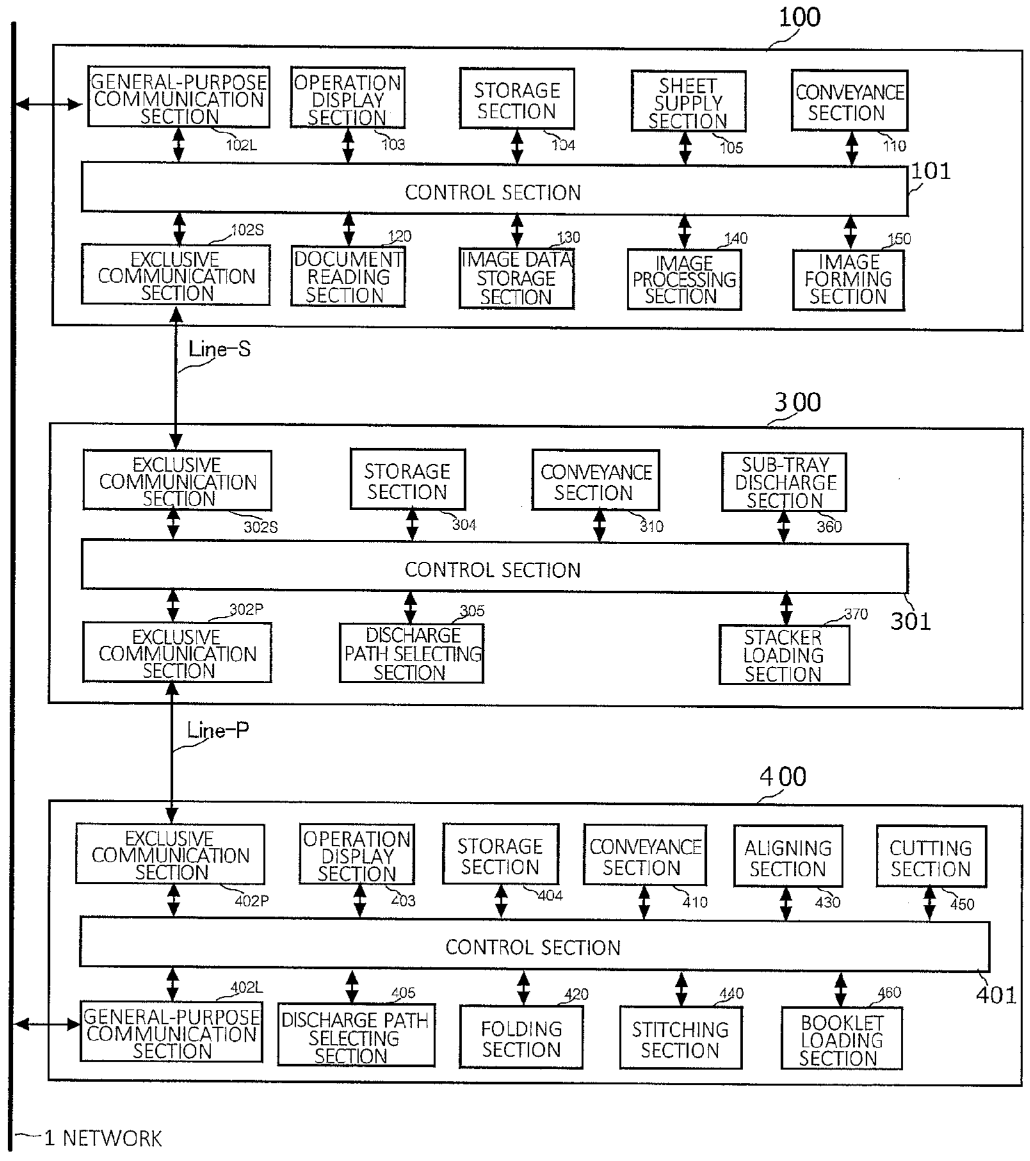
[FIG. 1] is a block diagram showing a structure of an image forming system of an embodiment of the present invention.
Figure 2:
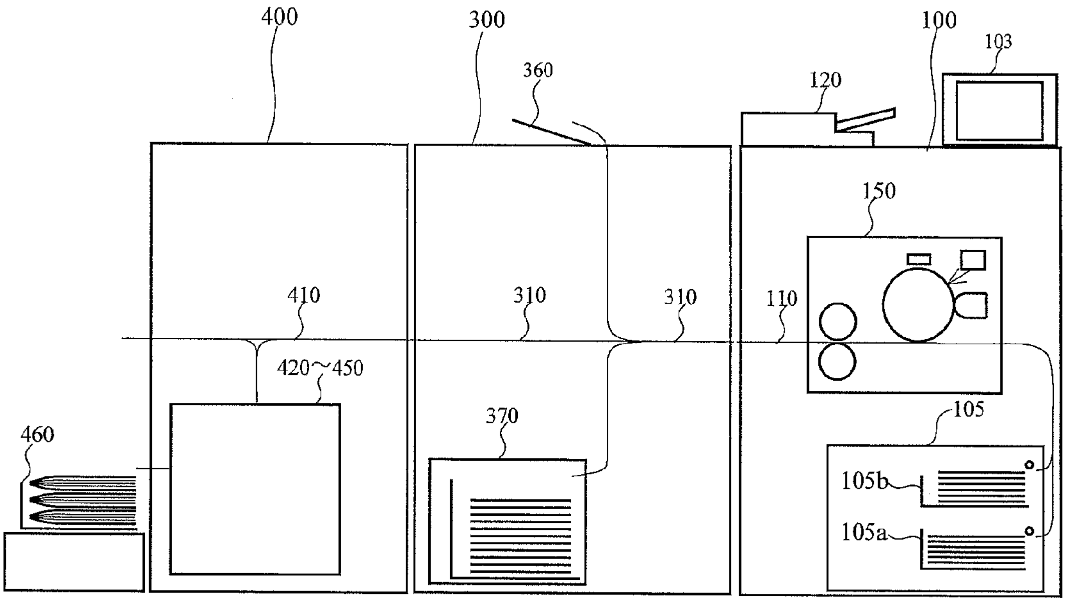
[FIG. 2] is a structural diagram showing a structure of an image forming system of an embodiment of the present invention.
Figure 3:
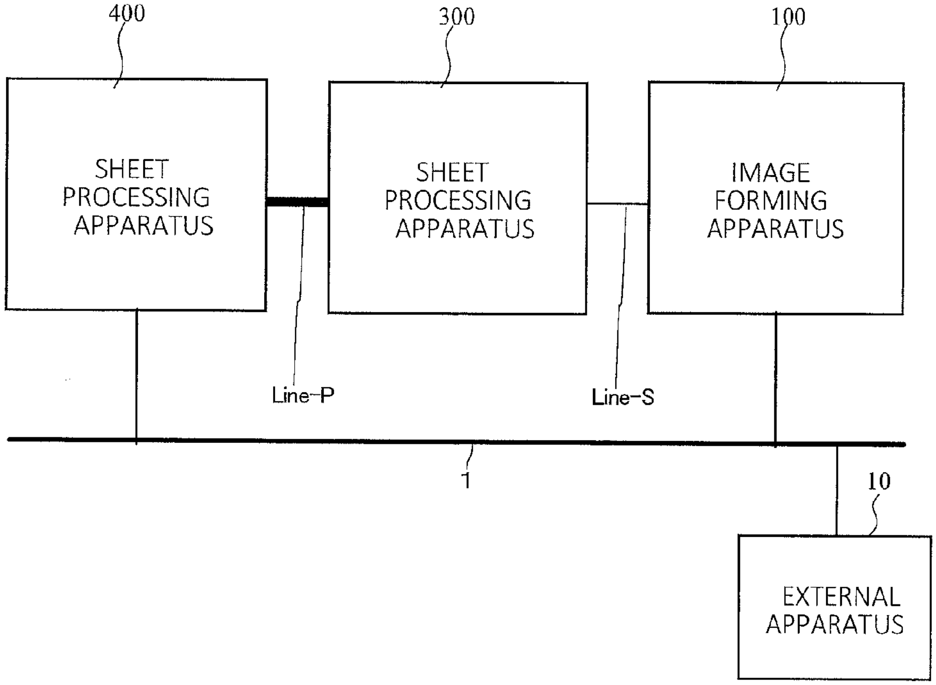
[FIG. 3] is a structural diagram showing a structure of an image forming system of an embodiment of the present invention.

Referring to FIGS. 1-3, the structure of an image forming system (1) of an embodiment of the present invention is described. As shown in FIGS. 1-3, this image forming system forms an image forming system in the condition where an image forming apparatus 100 as an upstream apparatus, a sheet processing apparatus 300 as an upstream apparatus and a sheet processing apparatus 400 as a downstream apparatus are connected in series. The words "connected in series" means the condition where a sheet on which an image has been formed is subjected to sheet processing of the sheet processing apparatus 300 and sheet processing apparatus 400 in this order.

For a sheet on which an image has been formed by the image forming apparatus 100, the sheet processing apparatus 300 can conduct a sub-tray discharge, a large capacity stack and a through-conveyance. For the sheet on which an image has been formed by the image forming apparatus 100, the sheet processing apparatus 400 can conduct a booklet discharge by various sheet processes.

The sheet processing apparatus 300 is a genuine sheet processing apparatus manufactured by the same manufacturer as the image forming apparatus 100. The sheet processing apparatus 400 is a sheet processing apparatus manufactured by the third vender different from that of the image forming apparatus or a sheet processing apparatus of a type different from the image forming apparatus 100 and the sheet processing apparatus 300. For the following description for the embodiment, the case where the sheet processing apparatus 400 is a sheet processing apparatus manufactured by the third vender different from that of the image forming apparatus is the specific example.

The image forming apparatus 100 and the sheet processing apparatus 300 are connected by using a communication path Line-S of a serial communication as the first exclusive communication path whose communication partner is fixed. The sheet processing apparatus 300 and the sheet processing apparatus 400 are connected by a communication path Line-P of a parallel communication as the second exclusive communication path whose communication partner is fixed. The image forming apparatus 100 and the sheet processing apparatus 400 are connected by a network 1 such as a LAN as a general-purpose communication path through which communication is conducted under the condition where the communication partner is selectable.

The network 1 as a general-purpose communication path is connected with an external apparatus such as a computer (PC) 10 as well as the image forming apparatus 100 and the sheet processing apparatus 400. The exclusive communication path (Line-S or Line-P) transmits only information necessary for operations of the upstream apparatus (the image forming apparatus 100 and the sheet processing apparatus 300) and the downstream apparatus (the sheet processing apparatus 400). The general-purpose communication path (network 1) is configured to be capable of information transmission with the external apparatus when the external apparatus other than the upstream apparatus and downstream apparatus is connected thereto, as well as conducting communication of information necessary for the operations of the upstream apparatus and downstream apparatus.

The image forming apparatus 100 is configured to include a control section 101, a general-purpose communication section 102L, an exclusive communication section 102S, an operation display section 103, a storage section 104, a sheet supply section 105, a conveyance section 110, a document reading section 120, an image data storage section 130, an image processing section 140 and an image forming section 150.

The control section 101 controls the entire image forming system as well as controls each section in the image forming apparatus 100. The general-purpose communication section 102L communicates with another apparatus connected with the network 1. The exclusive communication section 102S communicates with the sheet processing apparatus 300 through the communication path Line-S. The operation display section 103 conducts a condition display for the image forming apparatus 100 as well as transmits operation input signals according to the operation input by the operator to the control section 101. The storage section 104 is used as a work area for the control program as well as stores the control program and various setting data. The sheet supply section 105 supplies sheets stored in the sheet supply stray. The conveyance section 110 conveys a sheet on which an image is to be formed at a predetermined speed. The document reading section 120 creates image data by scanning a document. The image data storage section 130 stores image data or various data to be used for image forming. The image processing section 140 conducts various types of image processing necessary for image forming. The image forming section 150 conducts image forming (printing) based on a command for image forming and image data.

The sheet on which an image has been formed by the image forming apparatus 100 is conveyed toward the sheet processing apparatus 300 on the downstream side in the sheet conveyance direction (hereinafter referred to as the subsequent stage). The sheet processing apparatus 300 is connected at the subsequent stage of the image forming apparatus 100. The sheet processing apparatus 300 is configured to include a control section 301, an exclusive communication section 302S, an exclusive communication section 302P, a storage section 304, a discharge path selecting section 305, a sub-tray discharge section 360, and a stacker loading section 370.

The control section 301 controls each section in the sheet processing apparatus 300. The exclusive communication section 302S communicates with the image forming apparatus 100 through a communication path Line-S. The exclusive communication section 302P communicates with the sheet processing apparatus 400 through a communication path Line-P. The storage section 304 is used as a work area for the control program as well as stores the control program and various setting data. The discharge path selecting section 305 selects a discharge path for discharging a sheet bundle subjected to the sheet processing. The sub-tray discharge section 360 discharges sheets to the sub-stray. The stacker loading section 370 loads sheets by using a large capacity stack.

The sheet processing apparatus 400 is connected at the subsequent stage of the sheet processing apparatus 300 so as to conduct the sheet processing. The sheet processing apparatus 400 is configured to include a control section 401, an exclusive communication section 402P, a general-purpose communication section 402L, an operation display section 403, a storage section 404, a discharge path selecting section 405, a conveyance section 410, a folding section 420, aligning section 430, a stitching section 440, a cutting section 450 and a booklet loading section 460. The control section 401 controls each section in the sheet processing apparatus 400. The exclusive communication section 402P communicates with the sheet processing apparatus 300 through the communication path Line-P. The general-purpose communication section 402L communicates with another apparatus connected with the network 1. The operation display section 403 conducts a condition display for the sheet processing apparatus 400 as well as transmits operation input signals according to the operation input by the operator to the control section 401. The storage section 404 is used as a work area of the control program as well as stores the control program and various setting data. The discharge path selecting section 405 selects a discharge path for discharging a sheet bundle subjected to the post-processing. The conveyance section 410 conveys sheets at a predetermined speed. The folding section 420 folds a sheet. The aligning section 430 aligns sheets. The stitching section 440 applies stapling to the aligned sheet bundle. The cutting section 450 cuts off an edge portion of the stitched sheet bundle. The booklet loading section 460 loads the sheet bundle at the state of a booklet after stitching and cutting to discharge the sheet bundle.

When the sheet processing which the sheet processing apparatus 400 is capable of is limited to only the saddle stitching discharge or the like, the sub-stray discharge of the sheet processing apparatus 300 is substituted for the straight discharge without the discharge of the saddle stitched booklet. When the input conveyance speed to the sheet processing apparatus 400 is fixed and is different from the output conveyance speed of the image forming apparatus, the speed adjustment is performed in the sheet processing apparatus 300. When the height of input position of the image processing apparatus 400 is different from the height of discharge position of the image forming apparatus 100, the conveyance height is adjusted in the sheet processing apparatus 300.

When the subsequent stage side communication form of the image forming apparatus is different from the preceding stage side communication form of the sheet processing apparatus 400, the communication form is converted in the sheet processing apparatus 300. According to the structure in this case, the image forming apparatus 100 transmits information by a serial communication and the sheet processing apparatus 400 transmits information by a parallel communication. Thus, the sheet processing apparatus 300 conducts conversion between the serial communication and parallel communication.

[Description for the Communication]

Here, the communication form and communication standard used for the present embodiments are described. In the present embodiments, information is transmitted by the serial communication which transmits and receives data in series through the first exclusive communication path and information is transmitted by the parallel communication which transmits and receives data in parallel through the second exclusive communication path. Through the general-purpose communication path, information is transmitted by transmitting and receiving data in the form of a packet by a TCP/IP protocol through Ethernet (registered trademark) or the like.

Figure 4:
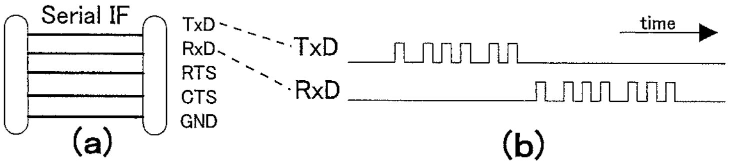
[FIG. 4] is an explanatory diagram illustrating a serial communication of an embodiment of the present invention.

FIG. 4 shows a communication condition of the serial communication such as a RS232C or RS422 as a communication protocol used in the first exclusive communication path of the present embodiment. FIG. 4*a* shows an example of a serial communication interface and FIG. 4*b* shows an example of a transmission and reception timing of serial communication data. The signal T×D means transmission data, signal R×D means reception data, signal RTS means transmission request and signal CTS means transmission possible. Different multiple types of information (refer to FIG. 6 to be described later) are transmitted or received as data in series.

This serial communication can include more detailed information than the parallel communication to be described later. For example, in the case of jam occurrence, information on the jam position or the cause of jam occurrence can be included in the serial communication. As a wait information (information on standby), information on the degree of length of necessary standby time can be included (refer to FIG. 6).

Figure 5:
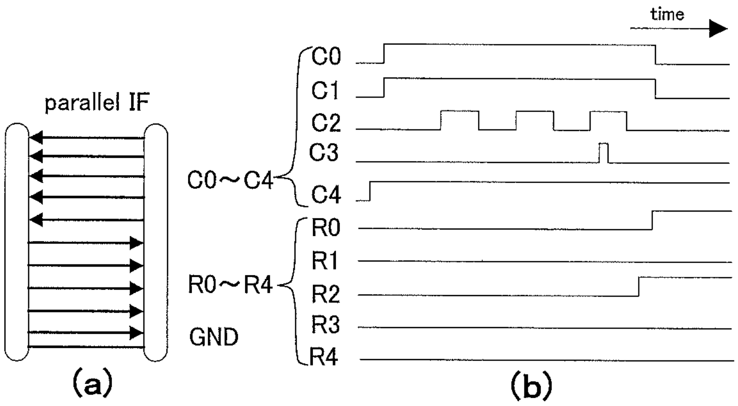
[FIG. 5] is an explanatory diagram illustrating a parallel communication of an embodiment of the present invention.

On the other hand, FIG. 5 shows a communication state by the parallel communication such as that of Centronics as a communication protocol used in the second exclusive communication path of the present embodiment. FIG. 5*a* shows an example of a parallel communication interface. FIG. 5*b* shows an example of transmission and reception timings of parallel communication data. In this case, the ON/Off of signals whose control contents have been determined independently and in parallel such as signals C0, C1, C2, C3 and C4, and R0, R1, R2, R3 and R4 are transmitted or received.

In the present embodiment, as signals of the parallel communication, the signals C0-C4 are used for communication from the sheet processing apparatus 300 to the sheet processing apparatus 400. The signals R0-R4 are used for communication from the sheet processing apparatus 400 to the sheet processing apparatus 300.

Because of the difference of the above-described communication form, generally the serial communication can perform more speedy and larger capacity communication than the parallel communication. Further, the serial communication can perform longer distance transmission than the parallel communication.

FIG. 6 shows each name of signals of the serial communication and whether or not they correspond to the parallel communication ("parallel correspondence" in FIG. 6). The item "possible" in the column of the parallel correspondence shows that the parallel communication can also perform information transmission corresponding to the serial communication. The item "partially possible" in the column of the parallel correspondence shows that the parallel communication can also perform transmission of a part of information corresponding to the serial communication. The item "impossible" in the column of the parallel correspondence shows that the parallel communication corresponding to the serial communication is impossible.

There are signals which are under severe conditions in regard to the time from transmission or reception of communication till the reflection of it to the operations and there are signals which are not. For example the sheet discharge signal (ON/OFF) C2 or R3 is used for control of an acceleration timing of a reception side conveyance roller. Therefore, if the timing is not suitable, this causes reduction of productivity or a control failure. Thus the time condition is very severe. Accordingly, for these signals under severe time conditions, not a LAN communication having possibility of time delay of the signal transmission but the parallel communication without time delay of the signal transmission is used.

The wait information in the serial communication is not used in the parallel communication, however, the sheet processing apparatus 300 fills the role instead. Further, in regard to a jam notice, a door-open notice, an alarm notice, when a jam occurs in the sheet processing apparatus 400, the abnormality notification signal R1 is turned ON in the parallel communication and the occurrence of abnormality is notified. However, even when the abnormality notification signal R1 is turned ON in the parallel communication, what kind of abnormality occurs cannot be known.

As shown above, since the handled information contents are limited in the parallel communication, all of the information transmitted by the serial communication can not be transmitted by the parallel communication. In other words, the parallel communication can be used by many types of apparatuses, however only the minimum information for the operation can be transmitted. In this embodiment, words "information cannot be transmitted" includes not only the case where information transmission is impossible because of different communication protocols but also the case where amount of allocated commands or data is small because defined contents of information are limited. Similarly, the "information cannot be transmitted" includes the case where the precision or the number of digits of numerical value of handled information is different. Further similarly, the "information cannot be transmitted" includes the case where the communication is late for the suitable timing of the sheet processing because of a low communication speed. In this embodiment, "information can be transmitted" or "information can be handled" includes not only the case where communication protocols accord with but also the case where problems do not occur in the information transmission because of defined or allocated contents of information, precision or the number of digits of numerical value of handled information, processing timing caused by the communication speed and the like.

FIG. 8 shows an example of information which can be handled by a LAN communication used by the network 1 which is a general-purpose communication path of the present embodiment. The protocol of the LAN communication is a communication made by combining "Ethernet" (registered trademark) which is a general and physical standard and a "TCP/IP" protocol" defining an agreement of communication contents. In this embodiment, the image forming apparatus 100 and the sheet processing apparatus 400 are connected with each other, but the condition is not limited to this. For example, when another apparatus is connected with the network 1, the apparatus becomes communicable with the image forming apparatus 100 and the sheet processing apparatus 400.

As the network 1, a multipoint to multipoint communication is possible by using a hub or the like, but when communication is conducted only between the image forming apparatus 100 and the sheet processing apparatus 400, a one to one communication by using a cross cable is also possible.

FIG. 8 shows each signal name of the LAN communication, and whether each signal corresponds to the serial communication ("serial correspondence" in FIG. 8) and whether each signal corresponds to the parallel communication ("parallel correspondence" in FIG. 8). The word "possible" in the columns of the serial correspondence and the parallel correspondence means that information transmission is possible in either the serial communication or parallel communication. The word "partially possible" in the columns of the serial correspondence and the parallel correspondence means that transmission of a part of information is possible in either the serial communication or the parallel communication. The word "impossible" in the columns of the serial correspondence and the parallel correspondence means that information transmission is impossible in the serial communication or the parallel communication.

In other words, information transmitted through the first exclusive communication path by a serial communication (FIG. 6) includes at least information transmitted through the second exclusive communication path by the parallel communication (FIG. 7). Further, information transmitted through the general-purpose communication path by a LAN communication (FIG. 8) includes at least information transmitted through the first exclusive communication path by the serial communication (FIG. 6), information transmitted through the second exclusive communication path by the parallel communication (FIG. 7) and other information. The information shown in FIGS. 6-8 is an example and the situation is not limited to this.

[Operation of the Image Forming System (1-1)]

Figure 9:
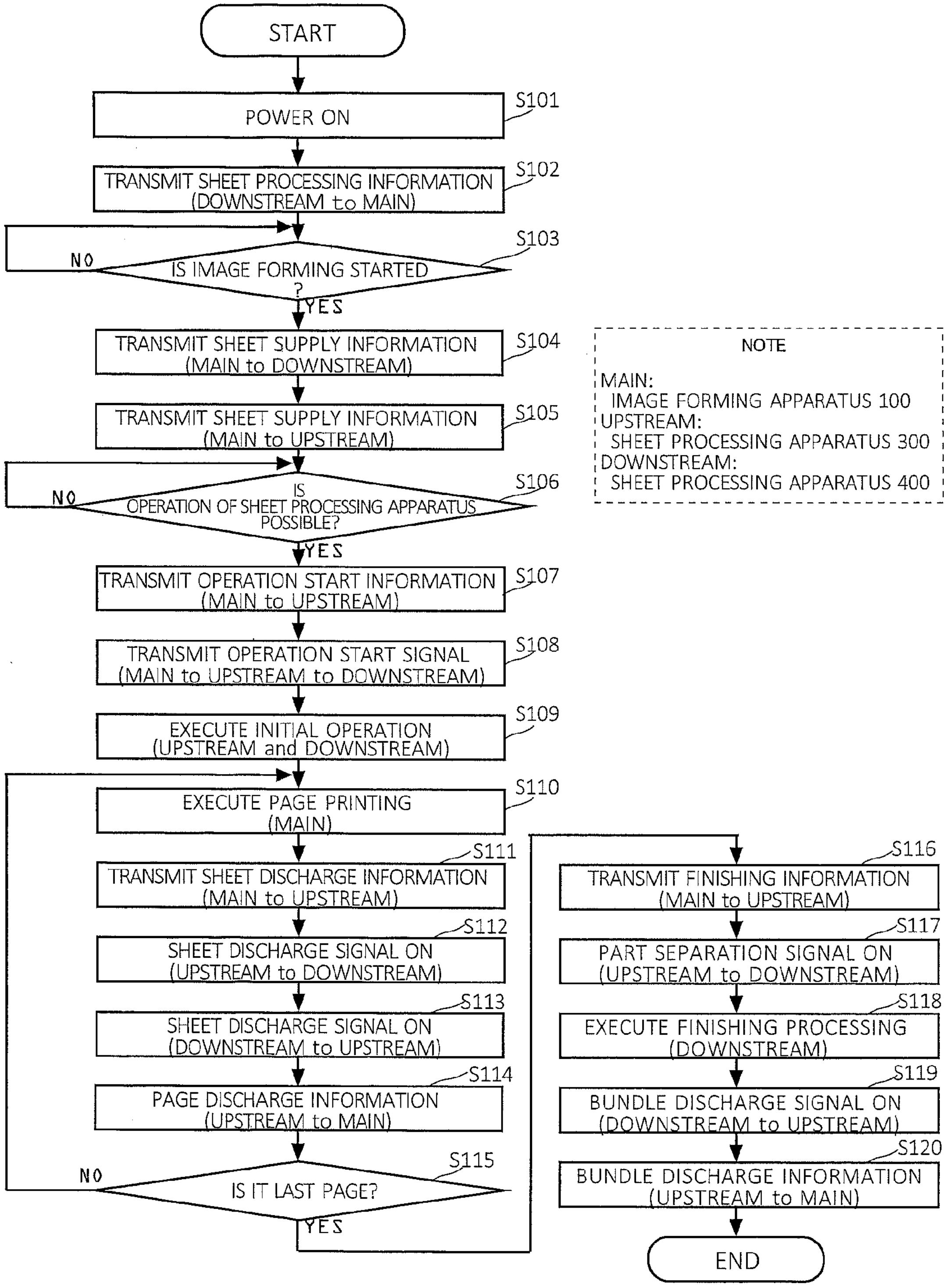
[FIG. 9] is a flowchart showing an operational condition of an embodiment of the present invention.
Figure 10:
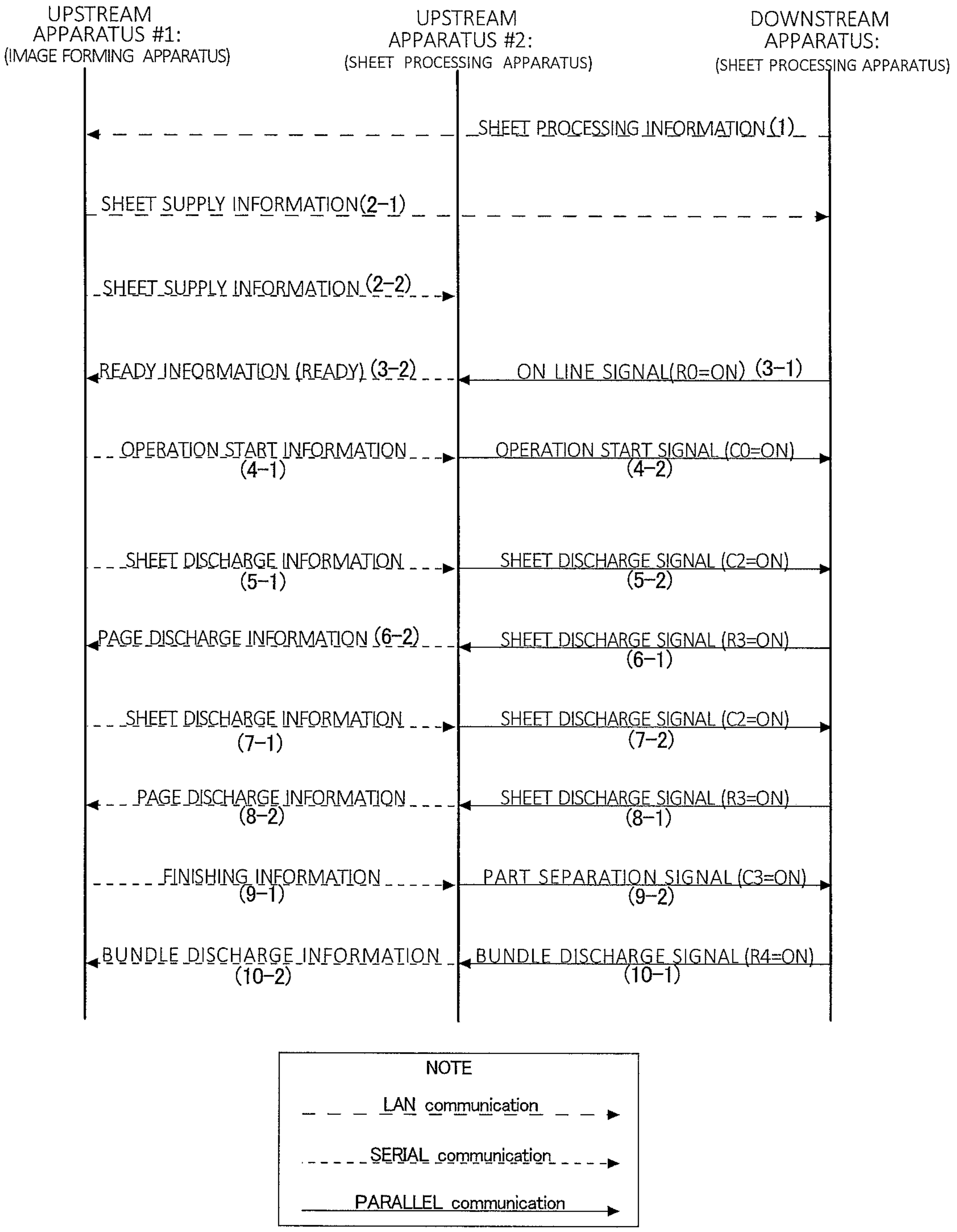
[FIG. 10] is a sequence diagram showing an operational condition of an embodiment of the present invention.

Here, basic operations of image forming and sheet processing in the image forming system shown in FIGS. 1-3 (operation (1-1)) are described by using a flowchart in FIG. 9 and a sequence diagram in FIG. 10.

In the following description of the operations, performance of transmission or reception of information or signals through the general-purpose communication section 102L or the exclusive communication section 102S by control of the control section 101 (execution of a communication control program) is described as "the image forming apparatus 100 transmits and receives, or communicates information or signals".

Similarly, operations of transmission and reception of information or signals by control of the control section 301 is described as an operation of the sheet processing apparatus 300. Operations of transmission and reception of information or signals by control of the control section 401 is described as an operation of the sheet processing apparatus 400.

First, the power of the image forming apparatus 100 is turned ON in the image forming system. In the sheet processing apparatus 300 which has received the instruction of power-on from the image forming apparatus 100 through the communication path Line-S, the power is turned ON, operating together with the image forming apparatus 100. In the sheet processing apparatus 400 which has received the instruction of power-on from the sheet processing apparatus 300 through the communication path Line-P, the power in turned ON, operating together with the image forming apparatus 100 and the sheet processing apparatus 300 (Step S101 in FIG. 9).

The sheet processing apparatus 400 transmits sheet processing information to the image forming apparatus 100 through the network 1 (Step S102 in FIG. 9, and FIG. 10(1)). This sheet processing information includes information on possible sheet processing which is practicable in the sheet processing apparatus 400 such as folding or stitching, and further includes information which the sheet processing apparatus 400 requests from the image forming apparatus 100 in order to produce booklets such as information on the imposition regarding a page order or a top and bottom of the image, information on the possible sheet size and information on the possible sheet basis weight (refer to FIG. 8).

These pieces of sheet processing information cannot be transmitted by the parallel communication shown in FIG. 7. Therefore, by using a LAN communication of the network 1, the information is transmitted from the sheet processing apparatus 400 to the image forming apparatus 100. The transmission of sheet processing information is carried out at the time of the start-up of the image forming system or the like. The image forming apparatus 100 receives these pieces of sheet processing information from the sheet processing apparatus 400 and determines the items or values to be set on the operation display section 403 of the sheet processing apparatus 400.

Then, start of the image forming (printing) is instructed from an operator (YES in Step S103 in FIG. 9). The printing instruction from the operator can be any one of an instruction by the operator on the operation display section 103 of the image forming apparatus 100 and an instruction from a PC 10 to the image forming apparatus 100 through the network 1 and the like.

According to the printing instruction, the image forming apparatus 100 transmits information on the sheet supply to the sheet processing apparatus 400 by a LAN communication through the network 1 (step S104 in FIG. 9, and FIG. 10 (2-1)).

This sheet supply information includes various types of information such as information on the post-processing mode (folding and stitching), information on the sheet size, information on the adjustment value such as the staple position, information on the sheet type and information on the sheet basis weight. Based on the sheet supply information, the sheet processing apparatus 400 determines a sheet process to be carried out to a sheet conveyed from the preceding stage and control parameters necessary for the sheet processing.

The image forming apparatus 100 transmits sheet supply information similar to the above to the sheet processing apparatus 300 through the communication path Line-S (step S105 in FIG. 9, and FIG. 10(2-2)). Regarding the sheet supply information to the sheet processing apparatus 400 by a LAN communication and the sheet supply information to the sheet processing apparatus 300 through the communication path Line-S, an example where the transmission through a LAN (step S104 in FIG. 9, and FIG. 10(2-1)) is earlier than the transmission through the communication path Line-S (step S105 in FIG. 9, and FIG. 10(2-2)) is illustrated but approximately simultaneous transmission is desirable.

When the sheet processing operation becomes possible after the sheet processing apparatus 400 receives the above-described sheet supply information, the sheet processing apparatus 400 turns the on-line signal R0 ON, in the communication path Line-P in order to indicate that the sheet processing operation becomes possible and transmits the signal to the sheet processing apparatus 300 (step S106 in FIG. 9, and FIG. 10(3-1)). The online signal from the sheet processing apparatus 400 is converted into ready information in the sheet processing apparatus 300. The ready information after the conversion is transmitted from the sheet processing apparatus 300 to the image forming apparatus 100 through the communication path Line-S (step S106 in FIG. 9, and FIG. 10(3-2)). When the sheet processing operation of the sheet processing apparatus 300 becomes possible after the sheet processing apparatus 300 receives the above-described sheet supply information, the sheet processing apparatus 300 turns the ready information (Ready) ON, in order to indicate that the sheet processing apparatus 300 itself becomes operable and transmits the information to the image forming apparatus 100 through the communication path Line-S.

The image forming apparatus 100 monitors the ready information from the sheet processing apparatus 300 through the communication path Line-S (step S106 in FIG. 9). When the image forming apparatus 100 can determine that the sheet processing apparatus 300 becomes operable after receiving the ready information (YES in step S106 in FIG. 9), the image forming apparatus 100 transmits the operation start information indicating an operation start to the sheet processing apparatus 300 through the communication path Line-S (step S107 in FIG. 9, and FIG. 10(4-1)).

The image forming apparatus 100 receives the on-line signal which has been converted into the ready signal by the sheet processing apparatus 300, and when it can be determined that the sheet processing apparatus 400 becomes operable (YES in step S106 in FIG. 9), the image forming apparatus 100 transmits an operation start signal indicating an operation start to the sheet processing apparatus 400 through the communication path Line-S, the sheet processing apparatus 300 and the communication path Line-P (step S108 in FIG. 9, and FIGS. 10(4-1) and 10(4-2)). The operation start information transmitted by the serial communication from the image forming apparatus 100 through the communication path Line-S is converted into an operation start signal C0 of the parallel communication through the communication path Line-P in the sheet processing apparatus 300 and reaches the sheet processing apparatus 400.

In the sheet processing apparatus 300 which has received the above operation start signal, the control section 301 initializes each section. By this initialization, the sheet processing apparatus 300 becomes operable (step S109 in FIG. 9). Further, in the sheet processing apparatus 400 which has received the above-described operation start signal, the control section 401 initializes each section. By this initialization, the sheet processing apparatus 400 becomes operable. (step S109 in FIG. 9).

Then the image forming apparatus 100 starts printing (step S110 in FIG. 9). The image forming apparatus 100 transmits sheet discharge information to the sheet processing apparatus 300 through the communication path Line-S at the moment the printed sheet is discharged from the image forming apparatus 100 (step S111 in FIG. 9, and FIG. 10(5-1)). Further, the sheet processing apparatus 300 transmits the ON of sheet discharge signal C2 to the sheet processing apparatus 400 through the communication path Line-P at the moment the sheet which has been conveyed from the image forming apparatus 100 is discharged from the sheet processing apparatus 300 (step S112 in FIG. 9, and FIG. 10(5-2)).

When the sheet processing apparatus 400 normally receives a sheet from the image forming apparatus 100 by way of the sheet processing apparatus 300, the sheet processing apparatus 400 notifies the image forming apparatus 100 of the sheet reception in response to the reception of the above-described sheet discharge signal C2. For this notification, the sheet processing apparatus 400 turns the sheet discharge signal R3 ON, which means the sheet reception, in the communication path Line-P and transmits the signal to the image forming apparatus 100 by way of the sheet processing apparatus 300 (step S113, step S114 and FIGS. 10(6-1) and 10(6-2)). The sheet discharge signal (FIG. 10(6-1)) of the parallel communication from the sheet processing apparatus 400 through communication path Line-P is converted into page discharge information of the serial communication through the communication path Line-S in the sheet processing apparatus 300 and reaches the image forming apparatus 100 (FIG. 10(6-2)).

Because of the above-described page discharge information and sheet discharge signal, the number of sheets processed by the sheet processing apparatus 300 and the sheet processing apparatus 400 can be counted by the control section 101 of the image forming apparatus 100.

The image forming apparatus 100, the sheet processing apparatus 300 and the sheet processing apparatus 400 repeat the above-described processes from the first page to the last page on which images are to be formed (NO□S110 in step S115 in FIG. 9). The sequence diagram in FIG. 10 indicates the case where printing for two sheets is conducted. To be more specific, FIG. 10 shows an example in which the sheet discharge information (5-1), sheet discharge signal (5-1), sheet discharge signal (6-1) and page discharge information (6-2) is carried out for the first sheet and the sheet discharge information (7-1), sheet discharge signal (7-1), sheet discharge signal (8-1) and page discharge information (8-2) is carried out for the second sheet When the time for producing a booklet after sheets including the last sheet printed by the image forming apparatus 100 have been sent to the sheet processing apparatus 400 (YES in step S115 in FIG. 9), finishing information of the serial communication indicating the time for performing the sheet processing is transmitted from the image forming apparatus 100 to the sheet processing apparatus 300 through the communication path Line-S (step S116 in FIG. 9, and FIG. 10(9-1)). The sheet processing apparatus 300 converts the finishing information of the serial communication from the image forming apparatus 100 into the ON of part separation signal C3 of the parallel communication and transmits it to the sheet processing apparatus 400 through the communication path Line-P (step S117 in FIG. 9, and FIG. 9-2)).

The sheet processing apparatus 400 which has received the ON of part separation signal C3 conducts the designated sheet processing (for example, production of a saddle stitching booklet) as the finishing processing (step S118 in FIG. 9). The sheet processing apparatus 400 loads a produced booklet or the like on the booklet loading section 460 to discharge it (refer to FIG. 2).

When the sheet processing apparatus 400 has completed a desired product (for example, a saddle stitched booklet) after performing the designated sheet processing correctly, the sheet processing apparatus 400 turns the bundle discharge signal R4 ON and transmits the signal to the sheet processing apparatus 300 through the communication path Line-P (step S119 in FIG. 9, and FIG. 10(10-1)). The sheet processing apparatus 300 which has received the ON of the bundle discharge signal R4 converts the bundle discharge signal R4 of the parallel communication into the bundle discharge information of the serial communication and transmits the information to the image forming apparatus 100 through the communication path Line-S (step S120 in FIG. 9, and FIG. 10(10-2)).

As described above, in the image forming system which includes at least the image forming apparatus 100 as an upstream apparatus forming an image on a sheet and the sheet processing apparatus 400 as a downstream apparatus applying sheet processing to the sheet, the exclusive communication path (Line-S or Line-P) for performing communication at the state of fixing the communication partner between the upstream apparatus and the downstream apparatus and the general-purpose communication path (the network 1 of the LAN communication) for performing communication at the state of the communication partner being selectable between the upstream apparatus and the downstream apparatus are connected. Under this structure, control is carried out to allow the exclusive communication path and the general-purpose communication path to communicate respectively information which can be communicated. Due to this, information whose communication is restricted in the exclusive communication path can be communicated through the general-purpose communication path. Thus even when the sheet processing apparatus 400 as an apparatus of a different type is connected as the downstream apparatus, improvement of the operation state without restrictions becomes possible.

For signals whose timing is important such as for the sheet supply or sheet discharge, by not using the network 1 of the LAN communication which has possibility of a time delay but using the exclusive communication path (Line-S or Line-P), information communication having an excellent performance of real-time is secured and certain operations matching various timing for an image forming system.

Even when the image forming apparatus 100 has a function of transmitting information by the serial communication through the first exclusive communication path Line-S and the sheet processing apparatus 400 has a function of information communication by the parallel communication through the second exclusive communication path Line-P, the sheet processing apparatus 300 on the upstream side converts the communication form. Thus, when the sheet processing apparatus 400 of the third vender as an apparatus of a different type is connected, the operation as an image forming system is secured.

As described above, handling of information which can not be handled by the parallel communication by using the LAN communication and transmission of signals related to timing of the sheet conveyance by the parallel communication eliminate necessity of a mode setting operation respectively on the image forming apparatus 100 and the sheet processing apparatus 400 of the third vender and can constitute an image forming system easy to use for operators.

In the operations above, information transmitted through the first exclusive communication path Line-S includes at least information transmitted through the second exclusive communication path Line-P. The information transmitted through the network 1 as a general-purpose communication path includes other information as well as information transmitted through the first exclusive communication path Line-S. Due to this, information restricted in the second exclusive communication path more than the first exclusive communication path Line-S can be transmitted through the general-purpose communication path. Thus even in an image forming system where the sheet processing apparatus 400 as an apparatus of a different type is connected as an downstream apparatus with an upstream apparatus (the image forming apparatus 100 and the sheet processing apparatus 300), improvement of the operation state without restrictions is possible.

Even in the case where the sheet processing apparatus 400 conducting the parallel communication is connected downstream with the image forming apparatus 100 and the sheet processing apparatus 300 conducting the serial communication, information subjected to restrictions by the parallel communication can be transmitted through the network 1 which is a general-purpose communication path. Thus even in an image forming system where the sheet processing apparatus 400 as an apparatus of a different type is connected as a downstream apparatus with an upstream apparatus (the image forming apparatus 100 and the sheet processing apparatus 300), improvement of the operation state without restrictions is possible.

The sheet processing apparatus 300 connected with the sheet processing apparatus 400 through the second exclusive communication path Line-P converts information transmitted from the image forming apparatus 100 through the first exclusive communication path Line-S into information to be transmitted through the second exclusive communication path Line-P and transmits it downstream to the sheet processing apparatus 400. Further, the sheet processing apparatus 300 converts information transmitted from the sheet processing apparatus 400 through the second exclusive communication path Line-P into information to be transmitted through the first exclusive communication path Line-S and transmits it to the image forming apparatus 100. Due to this, communication of minimum necessary information between the image forming apparatus 100 and the sheet processing apparatus 400 is carried out through the sheet processing apparatus 300 and information other than this is carried out through the network 1 as the general-purpose communication path. Therefore, even in an image forming system where an apparatus of a different type is connected as the sheet processing apparatus 400 with the upstream apparatuses (the image forming apparatus 100 and the sheet processing apparatus 300), improvement of the operation state without restrictions is possible.

[Operation of the Image Forming System (1-2)]

Figure 11:
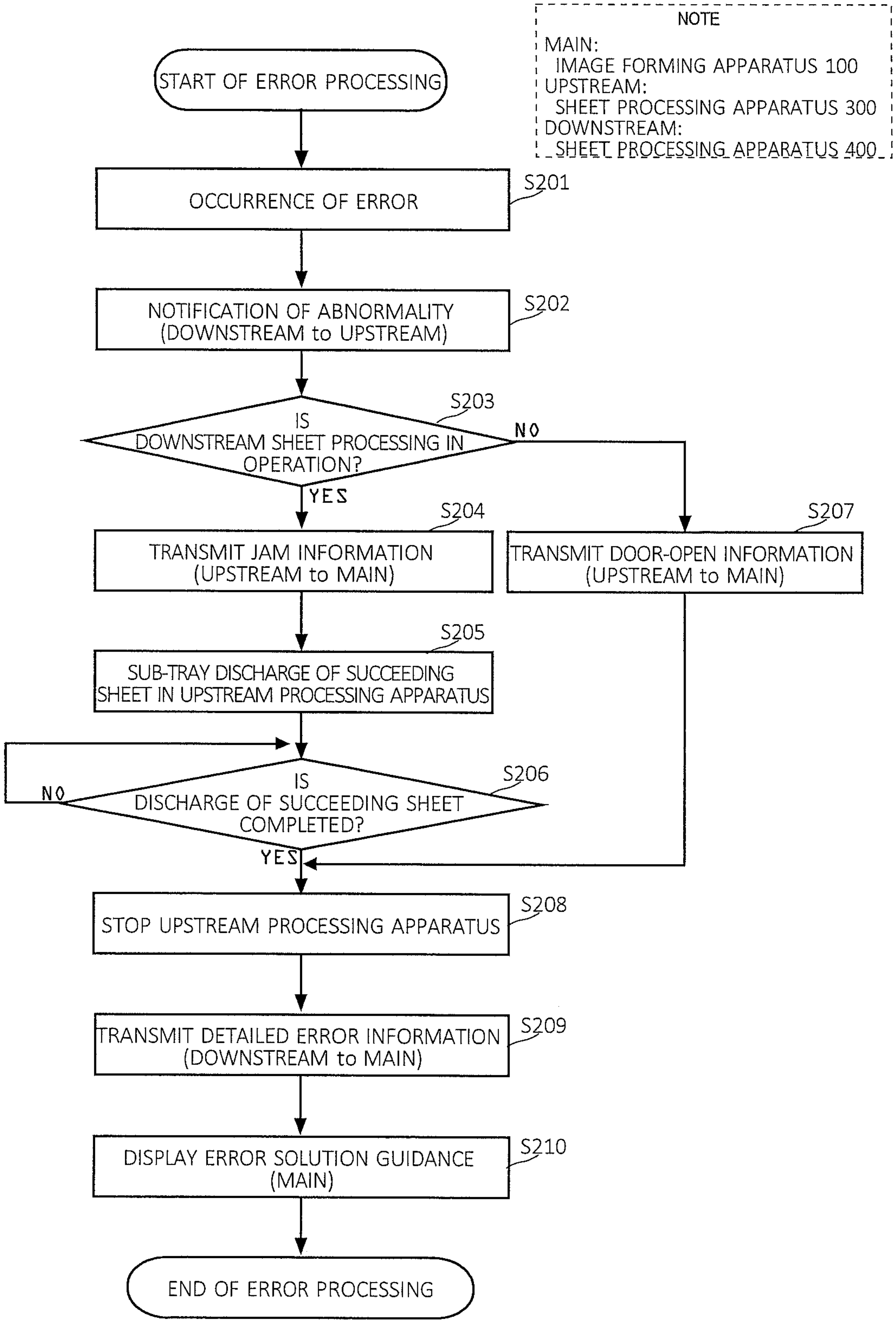
[FIG. 11] is a flowchart showing an operational condition of an embodiment of the present invention.
Figure 12:
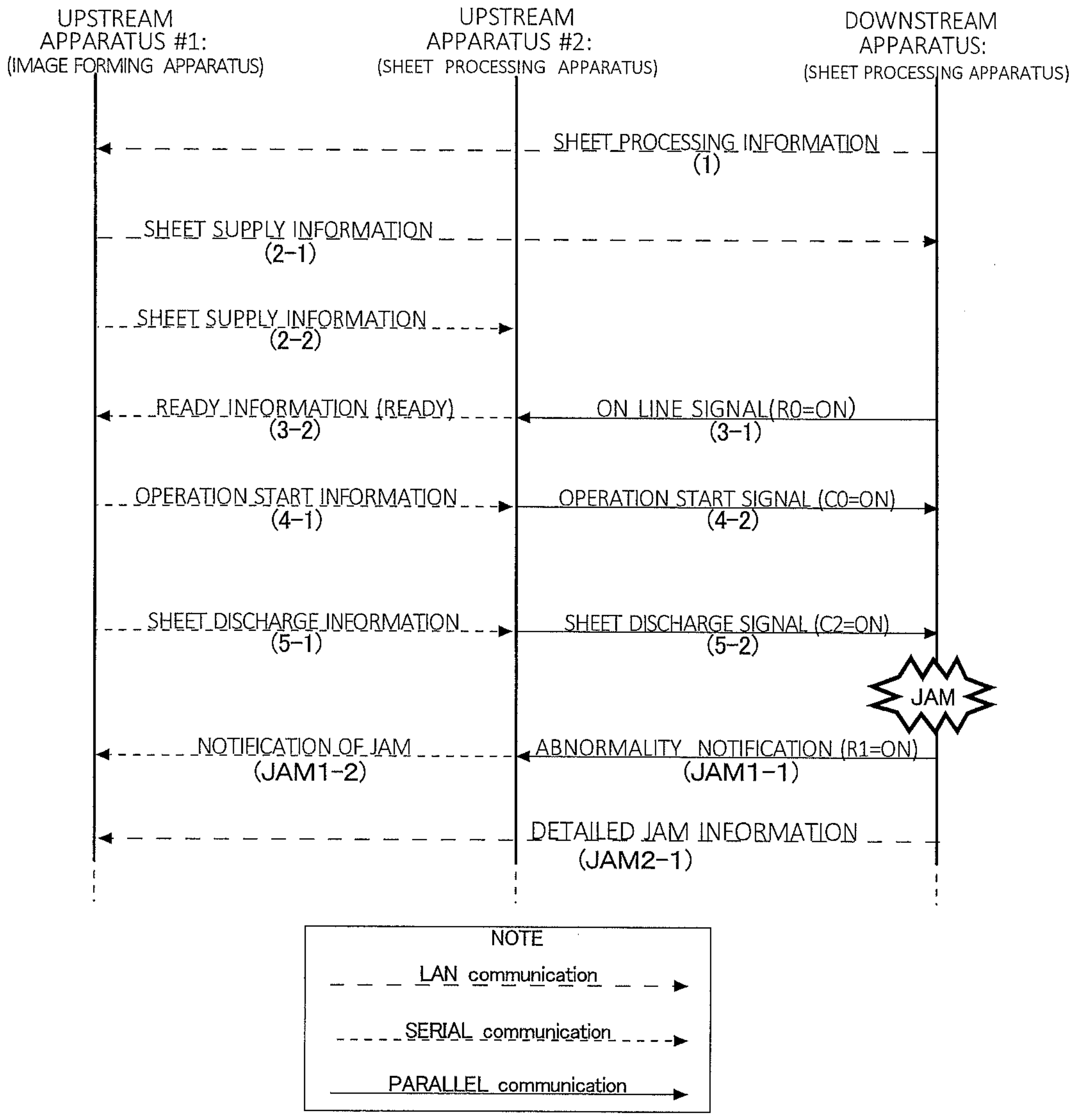
[FIG. 12] is a sequence diagram showing an operational condition of an embodiment of the present invention.
Figure 13:
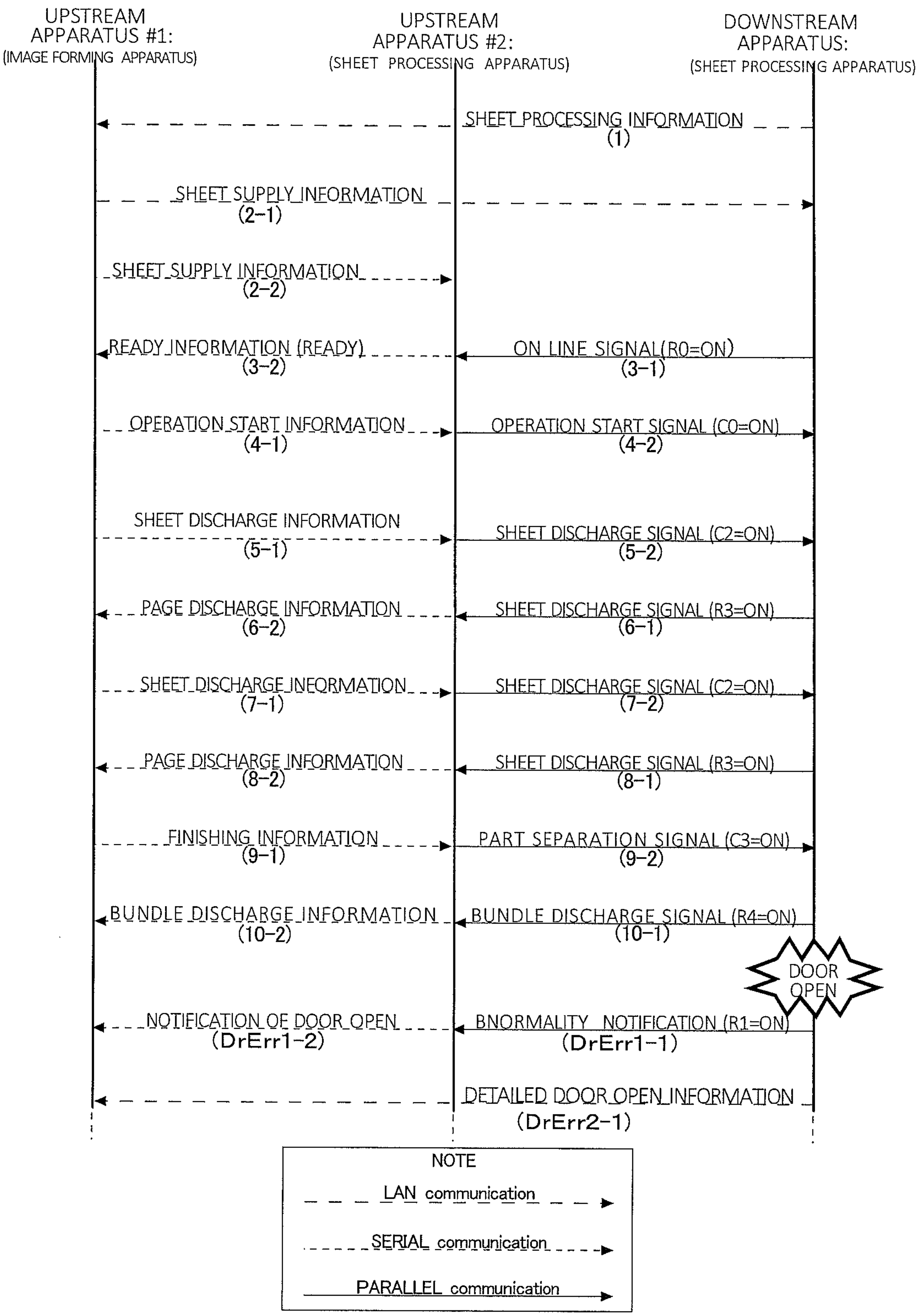
[FIG. 13] is a sequence diagram showing an operational condition of an embodiment of the present invention.

Here, by using the flowchart of FIG. 11 and the sequence diagrams of FIGS. 12 and 13, the operation at the time of error handling for the image forming and sheet processing (operation (1-2)) on the image forming system shown in FIGS. 1-3 (the image forming apparatus 100, the sheet processing apparatus 300 and the sheet processing apparatus 400) is described.

In the following description for operations, performance of transmission and reception of information or signals through the general-purpose communication section 102L and the exclusive communication section 102S by the control of the control section 101 (execution of a communication control program) is described as "the image forming apparatus 100 transmits and receives, or communicates information or signals". Similarly, operations of transmission and reception of information or signals by control of the control section 301 is described as operations of the sheet processing apparatus 300. Operations of transmission and reception of information or signals by control of the control section 401 is described as an operation of the sheet processing apparatus 400.

The flowchart in FIG. 11 illustrates mainly error handling when an error occurs in the sheet processing apparatus 400 on the downstream side. In the sequence diagram in FIGS. 12 and 13, the same writing is applied to the same portions as the sequence diagram in FIG. 10.

First, at any one of timings during operation of the image forming system, some error occurs in the sheet processing apparatus 400 (step S201 in FIG. 11). As this error, a sheet jam in the sheet processing apparatus 400 (JAM) or opening of some door provided on the sheet processing apparatus 400 ("DOOR OPEN") are supposed.

The sheet processing apparatus 400 turns the abnormality notification R1 ON indicating an occurrence of abnormality and transmits it to the sheet processing apparatus 300 through the communication path Line-P (step S202 in FIG. 11). The abnormality notification R1 of the parallel communication through the communication path Line-P can notify of only the occurrence of abnormality by turning itself ON. However, the abnormality notification R1 cannot include information on the position or contents of the abnormality.

The sheet processing apparatus 300 determines the apparatus state whether at the time of abnormality occurrence, the sheet processing apparatus 400 are executing sheet processing or not, based on the operation start command from the image forming apparatus 100 or the sheet discharge signal from the sheet processing apparatus 400 (step S203 in FIG. 11). If it is after the operation start command from the image forming apparatus 100 is transmitted and before the sheet discharge signal or bundle discharge signal from the sheet processing apparatus 400 is transmitted, it can be determined that the sheet processing apparatus 400 is executing sheet processing.

Here, details are described by supposing that a jam occurs in the sheet processing apparatus 400 after the sheet processing apparatus 300 turns the sheet discharge signal C2 ON (FIG. 12 (5-2) ("JAM" in FIG. 12).

When a jam occurs during the sheet processing operation in the sheet processing apparatus 400, the sheet processing apparatus 400 turns the abnormality notification R1 ON by the parallel communication through the communication path Line-P toward the sheet processing apparatus 300 as described above (step S202 in FIG. 11, and FIG. 12 (JAM1-1)).

The sheet processing apparatus 300 cannot understand what kind of abnormality has occurred from the ON of the abnormality notification R1. However, in view of the fact that the abnormality notification comes while the sheet discharge signal has not come from the sheet processing apparatus 400 during the operation (refer to FIG. 12), the sheet processing apparatus 300 can understand that the jam occurred during the sheet processing as the apparatus state (YES in step S203 in FIG. 11).

The sheet processing apparatus 300 converts the abnormality notification R1 from the communication path Line-P (step S202 in FIG. 11) into a jam notification and transmits it to the image forming apparatus 100 through the communication path Line-S (step S204 in FIG. 11, and FIG. 12 (JAM1-2)). Further, the sheet processing apparatus 300, in order not to send a sheet which is left unconveyable (a succeeding sheet to the jammed sheet) in the sheet processing apparatus 300 to the sheet processing apparatus 400, discharges it onto the sub-stray in the sub-tray discharge section 360 (step S205 in FIG. 11). The sheet processing apparatus 300 stops the operation (step S208 in FIG. 11) at the time of completion of discharge of the succeeding sheet whose sub-tray discharge is possible (YES in step S206 in FIG. 11).

The jam notification transmitted from the sheet processing apparatus 300 to the image forming apparatus 100 is information made by estimation from the abnormality notification R1. Therefore, the image forming apparatus 100 which controls the whole of the image forming system cannot grasp what type of jam occurred, where the jam occurred or where is the remaining sheet However, the operator needs detailed information on the jam to remove the remaining sheet as a jam recovery process. Therefore, the sheet processing apparatus 400 transmits detailed jam information such as on the type of jam, jam position, and position of the remaining sheet to the image forming apparatus 100 by a LAN communication through the network 1 (step S209 in FIG. 11, and FIG. 12 (JAM2-1)).

The image forming apparatus 100 which has received this detailed jam information through the network 1 displays how to remove the jammed sheet or remaining sheet on the operation display section 103 as a jam recovery process (step S210 in FIG. 11).

Next, when discharging a saddle stitched booklet, the sheet processing apparatus 400 turns the bundle discharge signal R4 ON (FIG. 13(10-1)) and transmits it to the sheet processing apparatus 300. Then, the detailed operation of the present embodiment will be described referring to the sequence diagram in FIG. 13 on the supposition that a door-open occurs in the sheet processing apparatus 400 after the sheet processing apparatus 300 which has received this bundle discharge signal R4 transmits the bundle discharge information to the image forming apparatus 100 ("DOOR OPEN" in FIG. 13).

The bundle discharge signal R4 from the sheet processing apparatus 400 is converted into the bundle discharge information in the sheet processing apparatus 300 and transmitted to the image forming apparatus 100. After this, if the door-open of any door occurs in the sheet processing apparatus 400 ("DOOR OPEN" in FIG. 13), the sheet processing apparatus 400 turns abnormality notification R1 ON by the parallel communication through the communication path Line-P toward the sheet processing apparatus 300 as described above (step S202 in FIG. 11, and (DrErr1-1)).

The sheet processing apparatus 300 cannot understand what kind of abnormality has occurred from the ON of the abnormality notification R1. However, since the abnormality notification R1 comes after the bundle discharge signal R4 comes from the sheet processing apparatus 400 during the operation (refer to FIG. 13), it can be determined that a door-open has occurred because a sheet does not exist in the sheet processing apparatus 400 as the apparatus state (No in step S203 in FIG. 11).

The sheet processing apparatus 300 converts the abnormality notification R1 from the communication path Line-P (step S202 in FIG. 11) into a door-open notification and transmits to the image forming apparatus 100 through the communication path Line-S (step S207 in FIG. 11, FIG. 13 (DrErr1-2)). The sheet processing apparatus 300 stops its operation (S208 in FIG. 11).

Since the door-open notification transmitted from the sheet processing apparatus 300 to the image forming apparatus 100 is information made based on assumption from the abnormality notification R1, the image forming apparatus 100 which controls the whole of the image forming system cannot grasp which door occurs the door-open.

However, for the operator to close the door as a door-close process, detailed information on the door-open is necessary. The sheet processing apparatus 400 transmits detailed jam information such as on the door-open position and the position of the remaining sheet to the image forming apparatus 100 by a LAN communication through the network 1 (step S209 in FIG. 11, and FIG. 13 (DrErr2-1)).

The image forming apparatus 100 which has received this detailed door-open information through the network 1, displays how to close the open door on the operation display section 103 as the recovery process for door-open (door-close process) (step S210 in FIG. 11).

As described above, when an abnormality occurs in the sheet processing apparatus 400, the sheet processing apparatus 400 creates the first abnormality information (abnormality notification R1) indicating an abnormality occurrence of the sheet processing apparatus 400 and transmits it to the sheet processing apparatus 300 through the communication path Line-P. The sheet processing apparatus 300 based on the state information of the sheet processing apparatus 400 (conditions of each type of signals) and the first abnormality information, creates the second abnormality information (jam notification or door-open notification) and transmits it to the image forming apparatus 100 through the communication path Line-S. The sheet processing apparatus 400 creates the third abnormality information (detailed jam information or detailed door-open information) based on the abnormal condition of the sheet processing apparatus 400 and transmits it to the image forming apparatus 100 through the network 1. Therefore, information which the first abnormality information transmitted upstream from the sheet processing apparatus 400 through the communication path Line-P fails to include, can be transmitted to the image forming apparatus 100 through the network 1 as the third abnormality information. Thus, even for the image forming system where an apparatus of a different type is connected as the sheet processing apparatus 400, the operation state can be improved without restrictions.

The first abnormality information is information indicating presence or absence of the abnormality occurrence and the second abnormality information is information created from first abnormality information and the apparatus state, and then the third abnormality information is information including the abnormality occurrence and abnormality contents. Due to this, information which the first abnormality information transmitted upstream from the sheet processing apparatus 400 through the second exclusive communication path Line-P fails to include, can be transmitted to the image forming apparatus 100 through the network 1 as the third abnormality information. Thus, even for the image forming system where an apparatus of a different type is connected as the sheet processing apparatus 400, the operation state can be improved by transmitting information on the abnormality occurrence and abnormality contents to the image forming apparatus 100 without restrictions to the operations.

To be specific, even in an image forming system where an apparatus of a different type is connected as the sheet processing apparatus 400, the operation state can be improved by transmitting information on the abnormality occurrence and abnormality contents and by conducting a recovery process for the jam or door-open without restrictions to the operations.

[Structure of the Image Forming System (2)]

Figure 14:
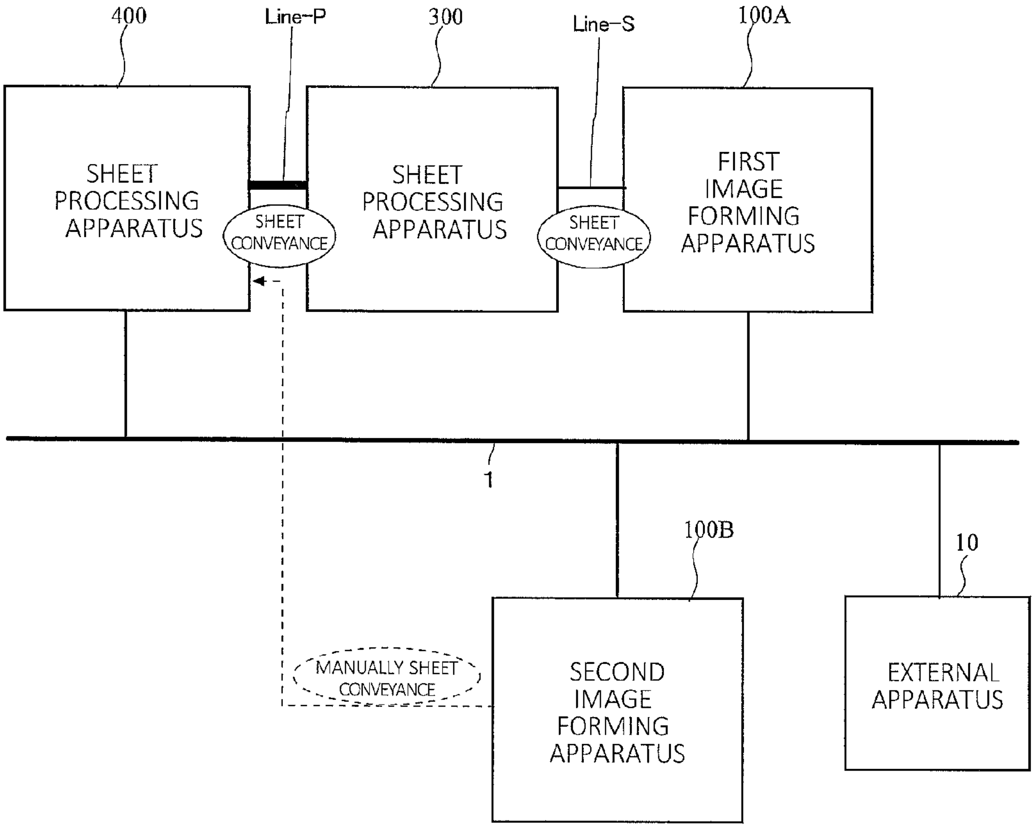
[FIG. 14] is a structural diagram showing a structure of an image forming system of an embodiment of the present invention.
Figure 15:
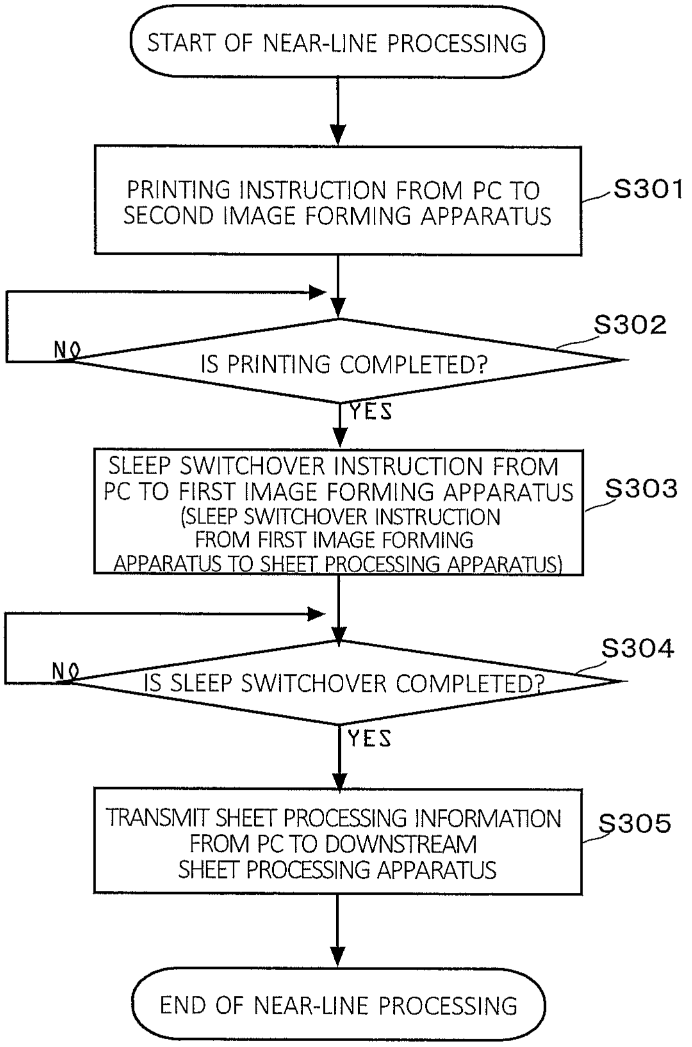
[FIG. 15] is a flowchart showing an operational condition of an embodiment of the present invention.
Figure 16:
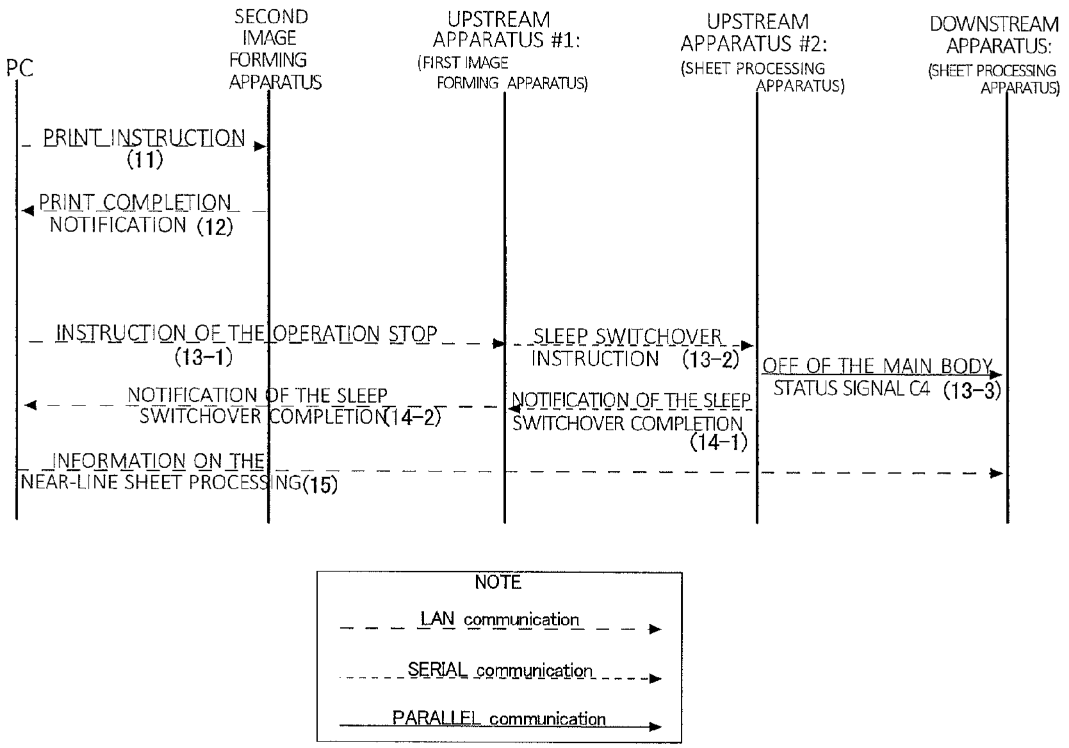
[FIG. 16] is a sequence diagram showing an operational condition of an embodiment of the present invention.

Referring to FIGS. 14-16, the structure of image forming system (2) of an embodiment of the present invention will be described.

As shown in FIG. 14, in this image forming system, the first image forming apparatus 100A as an upstream apparatus, the sheet processing apparatus 300 as an upstream apparatus and the sheet processing apparatus 400 of the third vendor as a downstream apparatus are connected in serial. That is to say, this image forming system forms an in-line image forming system where sheets are conveyed between the first image forming apparatus 100A, the sheet processing apparatus 300 and the sheet processing apparatus 400 ("SHEET CONVEYANCE" in FIG. 14).

The in-line image forming system applies sheet processing to a sheet on which an image is formed by the first image forming apparatus 100A, by using the sheet processing apparatus 300 and the sheet processing apparatus 400 in this order, and because it is the same as the system already described as the structure (1), repeated description will be omitted.

An external apparatus such as a computer (PC) and the second image forming apparatus 100B are connected with the network 1 as a general-purpose communication path as well as the first image forming apparatus 100A and the sheet processing apparatus 400.

The second image forming apparatus 100B is not mechanically connected with the in-line image forming system as the sheet conveyance path. The second image forming apparatus 100B is connected communicable with the first image forming apparatus 100A or the sheet processing apparatus 400 through the network 1 and is positioned near the in-line image forming system. Accordingly, sheets printed by the second image forming apparatus 100B can be manually conveyed to a sheet supply opening of the sheet processing apparatus 400 ("MANUAL SHEET CONVEYANCE" in FIG. 14). In other words, sheets printed by the second image forming apparatus 100B can be subjected to sheet processing called as a near-line processing by the sheet processing apparatus 400.

[Operation for the Image Forming System (2)]

By using the flowchart in FIG. 15 and the sequence diagram in FIG. 16, the operation at the time of the near-line processing (operation (2)) in a power saving mode on the image forming system shown in FIGS. 14-16 (the first image forming apparatus 100A, the second image forming apparatus 100B, the sheet processing apparatus 300 and the sheet processing apparatus 400 of the third vendor) will be described.

The near-line processing in a power saving mode means that the first image forming apparatus 100A and the sheet processing apparatus 300 are kept in the power saving mode and the sheet processing apparatus 400 is kept in an operation mode in the in-line image forming system.

In the following description of the operations, performance of transmission and reception of information or signals through a communication section by the control of the control section in each apparatus (execution of a communication control program) is described as "each apparatus transmits and receives, or communicates information or signals".

Here, it is assumed that regarding a booklet produced by sheet processing in the sheet processing apparatus 400, the second image forming apparatus 100B can print a sheet or can use a print mode, which the first image forming apparatus 100A cannot print or use. In this case, the operator by operating a PC 10 gives a print instruction to the second image forming apparatus 100B (step S301 in FIG. 15, and FIG. 16(11)). The second image forming apparatus 100B executes the instructed printing and when a sheet bundle is outputted on the discharge section (not illustrated) of the second image forming apparatus 100B, transmits a print completion notification to the PC 10 through the network 1 (YES in step S302 in FIG. 15, and FIG. 16(12)).

Next, the PC 10 gives an instruction of the operation stop to the first image forming apparatus 100A, which does not need to operate, for the sheet processing by the near-line processing by the sheet processing apparatus 400 (step S303 in FIG. 15, and FIG. 16(13-1)). For example, as this instruction of operation stop, a sleep switchover instruction for switching the operation mode to a sleep mode is corresponded. This sleep switchover instruction in preparation for the near-line processing is an instruction for switching the first image forming apparatus 100A and the sheet processing apparatus 300 to the sleep mode.

The first image forming apparatus 100A which has received this sleep switchover instruction through the network 1 gives the sleep switchover instruction to the sheet processing apparatus 300 through the communication path Line-S (FIG. 16(13-2)).

At this time, the sheet processing apparatus 300 transmits the OFF of the main body status signal C4 indicating the sleep mode of the first image forming apparatus 100A to the sheet processing apparatus 400 through the communication path Line-P (YES in step S304 in FIG. 15, and FIG. 16(13-3)).

After the sleep switchover is completed (YES in step S304 in FIG. 15), the sheet processing apparatus 300 transmits the notification of the sleep switchover completion to the first image forming apparatus 100A through the communication path Line-S (FIG. 16(14-1)). Further, after the sleep switchover is completed (YES in step S304 in FIG. 15), the first image forming apparatus 100A transmits the notification of the sleep switchover completion to the PC 10 through the network 1 (FIG. 16(14-2)).

After this, the PC 10 transmits information on the near-line sheet processing to the sheet processing apparatus 400 through the network 1 (step S305 in FIG. 15, and FIG. 16(15)). This near-line sheet processing information includes information on the sheet size or sheet processing mode.

Due to this, when executing the near-line sheet processing by using the second image forming apparatus 100B and the sheet processing apparatus 400, the operator does not need to set the sheet processing mode on the operation display section of the sheet processing apparatus 400. To be specific, the operator only need to carry a sheet bundle subjected to the printing output by the second image forming apparatus 100B to the sheet supply opening of the sheet processing apparatus 400 and to instruct a sheet processing start. As the start instruction to the sheet processing apparatus 400, the operator can operate on the operation display section at the time of carrying the sheet or the operator can give the instruction of sheet processing start of the sheet processing apparatus 400 from the PC 10.

By doing as described above, while the first image forming apparatus 100A and the sheet processing apparatus 300 which do not need to be used in the image forming system, are kept in the sleep mode for contribution to power saving, the near-line processing using the second image forming apparatus 100B which is not connected with the image forming system and the sheet processing apparatus 400 in the image forming system can be conducted efficiently.

Because information on such as the near-line sheet processing mode can be transmitted to the sheet processing apparatus 400 through a LAN communication of the network 1 for the operation, the usability is enhanced. Further, by using the near-line sheet processing, the operation efficiency of the sheet processing apparatus 400 of the third vendor which is connected as the image forming system can be enhanced.

To be specific, the upstream apparatuses (the image forming apparatus 100 and the sheet processing apparatus 300) stop their operations after the stop instruction information including an instruction for stopping the operation is transmitted from the PC 10 connected trough the network 1 as a general-purpose communication path is transmitted thereto. Then, the sheet processing apparatus 400 continues its operation by transmission of the sheet processing information from the PC 10 through the network 1 as a general-purpose path. Due to this, in the image forming system where an apparatus of a different type is connected as the sheet processing apparatus 400, operations of only the sheet processing apparatus 400 independent of the upstream apparatuses (the image forming apparatus 100 and the sheet processing apparatus 300) without restrictions of the operations is possible. Due to this, the sheet processing apparatus 400 can be operated as a finisher for the near-line from another image forming apparatus 100.

In the above-described image forming system, the exclusive communication path (Line-S or Line-P) conducts transmission of only necessary information for the operations of the upstream apparatus (the image forming apparatus 100 and the sheet processing apparatus 300) and the downstream apparatus (the sheet processing apparatus 400). The general-purpose communication path (network 1) is configured to be capable of information transmission with an external apparatus other than the upstream apparatus and downstream apparatus such as a PC 10 when the external apparatus is connected, as well as conducts transmission of information necessary for operations of the upstream apparatus and downstream apparatus. Due to this, communication between the downstream apparatus and the external apparatus becomes possible and in an image forming system where an apparatus of a different type is connected as a downstream apparatus, various operations become possible.

[Structure of the Image Forming System (3)]

Figure 17:
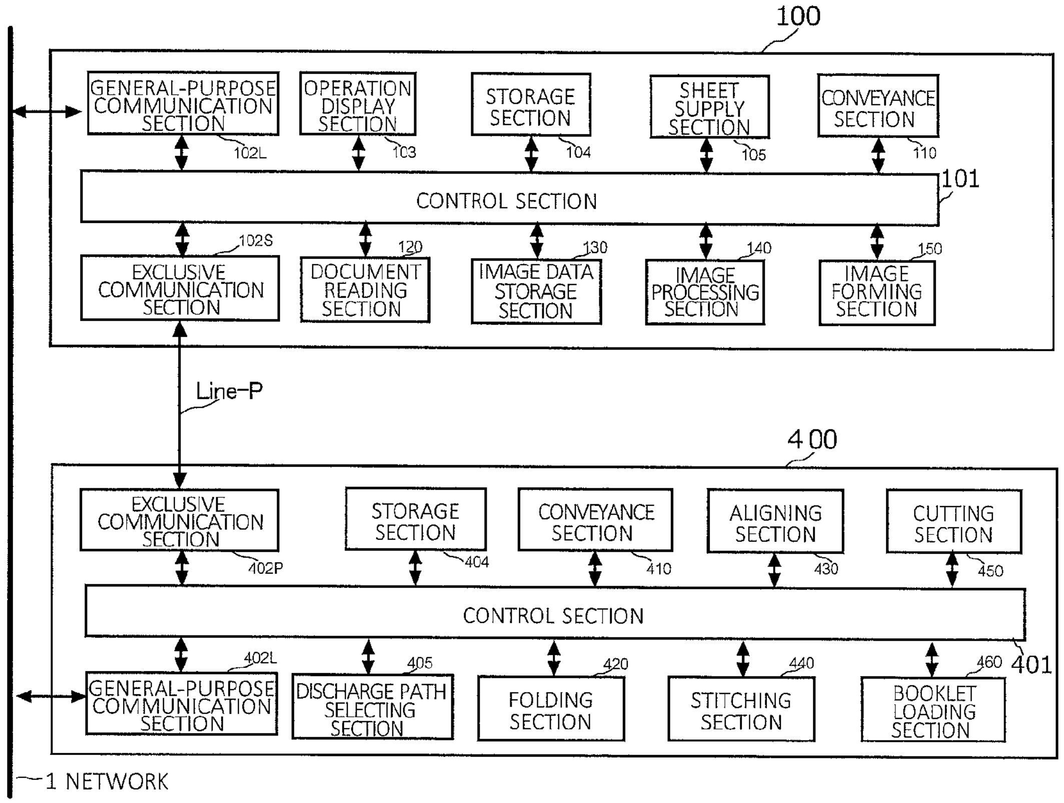
[FIG. 17] is a block diagram showing a structure of an image forming system of an embodiment of the present invention.
Figure 18:
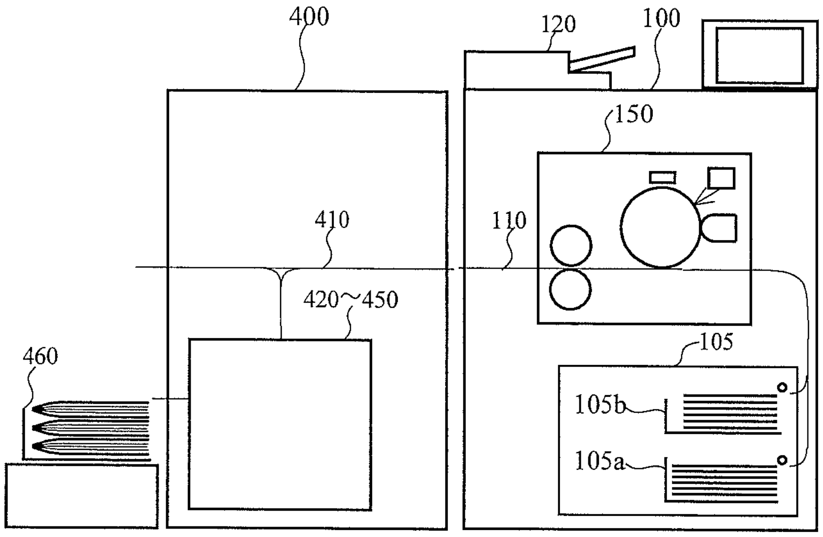
[FIG. 18] is a structural diagram showing a structure of an image forming system of an embodiment of the present invention.
Figure 19:
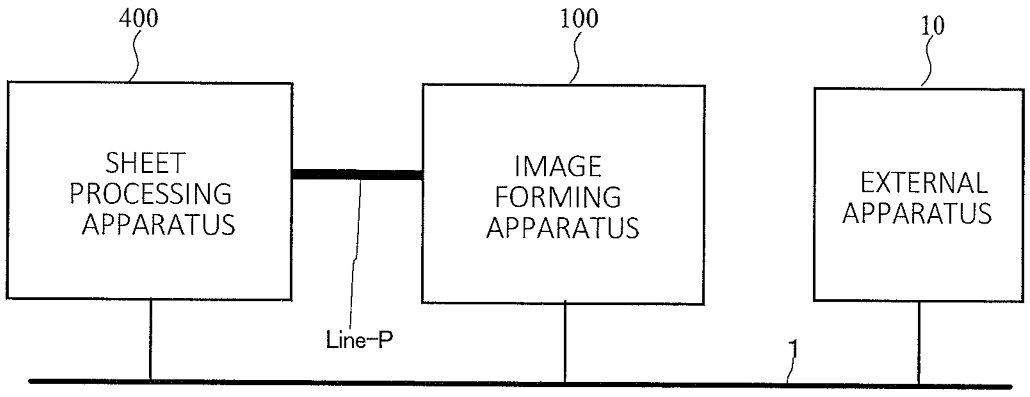
[FIG. 19] is a structural diagram showing a structure of an image forming system of an embodiment of the present invention.

Referring to FIGS. 17-19, the structure of image forming system (3) of an embodiment of the present invention will be described.

As shown in FIGS. 17-19, this image forming system is in the state where the image forming apparatus 100 as an upstream apparatus and the sheet processing apparatus 400 as the downstream apparatus are connected in series. The image forming system is capable of a booklet discharge by various types of sheet processing in the sheet processing apparatus 400 for the sheet on which an image is formed by the image forming apparatus 100.

In FIGS. 17-19, by giving the same number to the same thing as the image forming system shown in FIGS. 1-3, repeated description is omitted. As a different part, the image forming system is in the state where the sheet processing apparatus 300 is removed from the image forming system. The sheet processing apparatus 400 is a third-vender sheet processing apparatus manufactured by another company different from the image forming apparatus 100. In this case, when the output conveyance speed of the image forming apparatus 100 and the input conveyance speed of the sheet processing apparatus 400 is the same, and the height of discharge position of the image forming apparatus 100 and the height of input position of the sheet processing apparatus 400 is the same, the image forming apparatus 100 and the sheet processing apparatus 400 can be connected without using the sheet processing apparatus 300.

The image forming apparatus 100 and the sheet processing apparatus 400 are connected with each other by a communication path Line-P of the parallel communication in the state where the communication partner is fixed. The image forming apparatus 100 and the sheet processing apparatus 400 are connected with the network 1 of a LAN or the like as a general-purpose communication path which conducts communication in the state where the communication partner is selectable.

The network 1 as a general-purpose communication path is connected with an external apparatus such as a computer (PC) 10 other than the image forming apparatus 100 and the sheet processing apparatus 400.

[Operation for the Image Forming System (3)]

Figure 20:
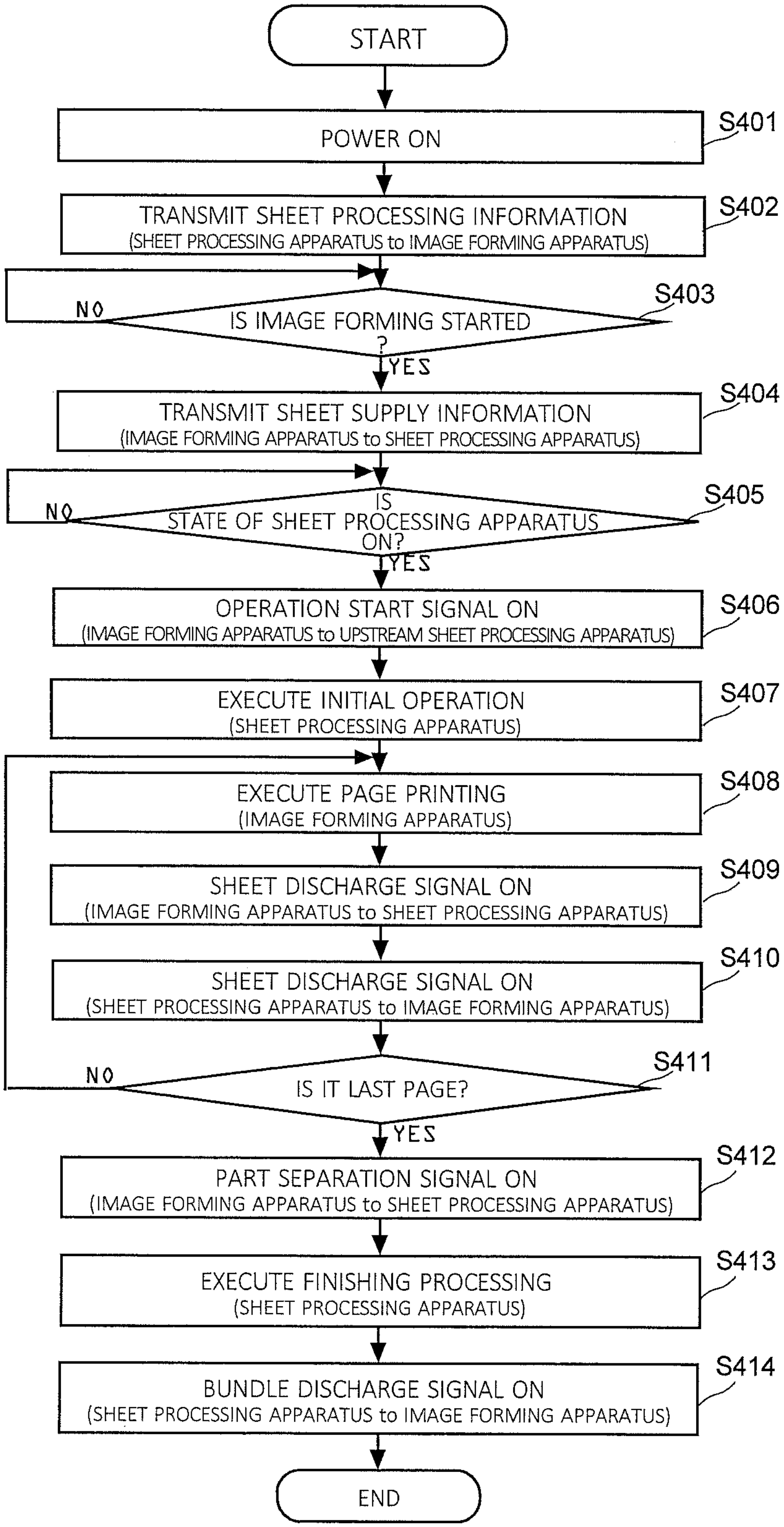
[FIG. 20] is a flowchart showing an operational condition of an embodiment of the present invention.
Figure 21:
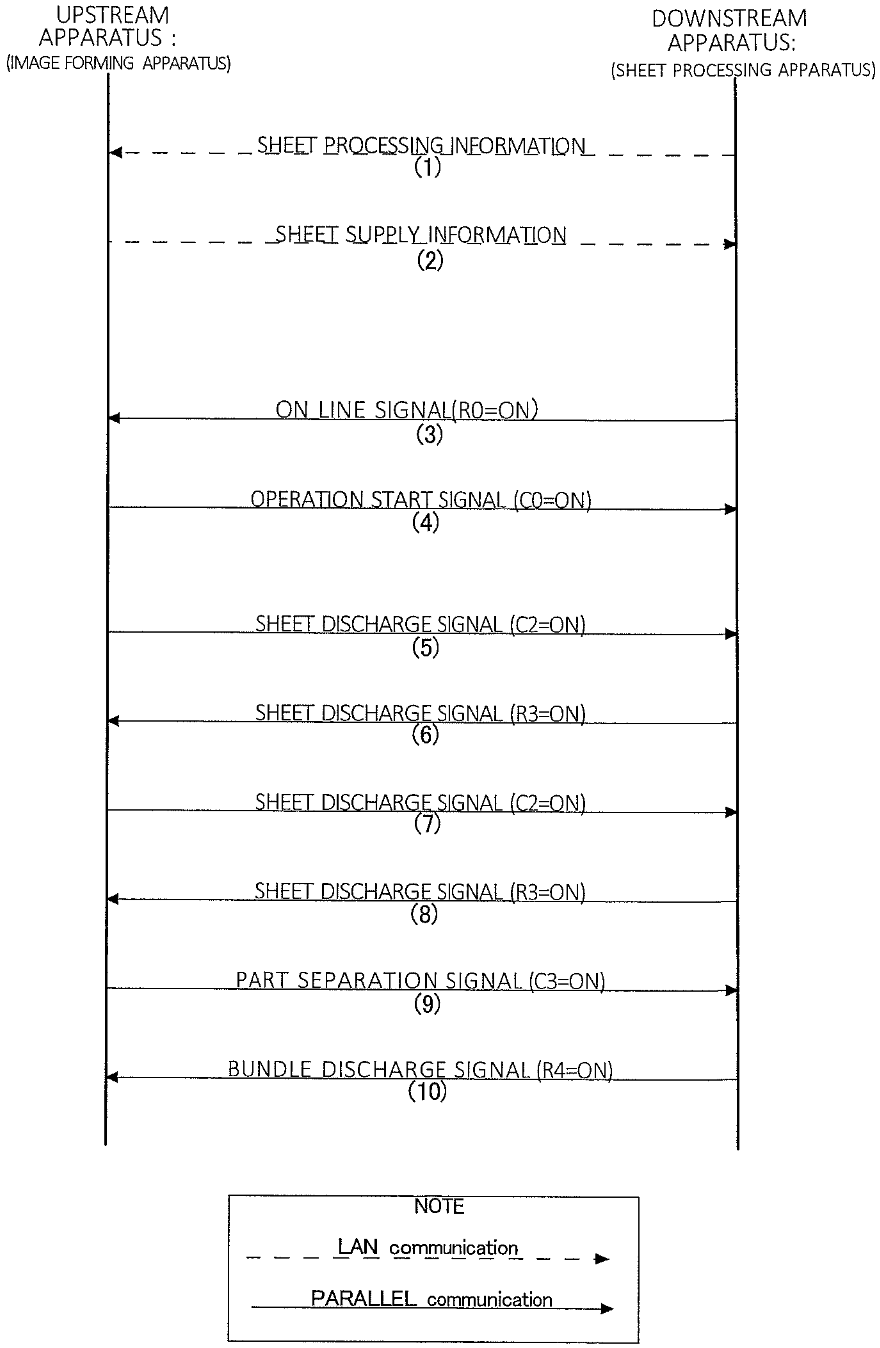
[FIG. 21] is a sequence diagram showing an operational condition of an embodiment of the present invention.

Here, using the flowchart in FIG. 20 and the sequence diagram in FIG. 21, basic operations for the image forming and sheet processing in the image forming system shown in FIGS. 17-19 (operation (3)) are described.

In the following description for operations, performance of transmission and reception of information or signals through the general-purpose communication section 102L or the exclusive communication section 102S by the control of the control section 101 (execution of a communication control program) is described as "the image forming apparatus 100 transmits and receives, or communicates information or signals". Similarly, operations of transmission and reception of information or signals by control of the control section 401 is described as operations of the sheet processing apparatus 400.

First, in the image forming system, the power of the image forming apparatus 100 is turned ON. Due to this, the sheet processing apparatus 400 receives the power ON instruction from the image forming apparatus 100 through the communication path Line-P. Then the power of the sheet processing apparatus 400 which has received the power ON instruction turns ON by operating together with the image forming apparatus 100 (step S401 in FIG. 20).

At this time, the sheet processing apparatus 400 transmits the sheet processing information to the image forming apparatus 100 through the network 1 (step S402 in FIG. 20, and FIG. 21(1)). This sheet processing information includes information on possible sheet processing which the sheet processing apparatus 400 can practice such as folding or stitching, imposition information which the sheet processing apparatus 400 requests from the image forming apparatus 100 to produce a booklet such as information on the page order or top and bottom of the image, information on the possible sheet size, or information on the possible sheet basis weight (refer to FIG. 8).

These pieces of the sheet processing information cannot be transmitted by the parallel communication through the communication path Line-P. Therefore, these pieces of the sheet processing information are transmitted from the sheet processing apparatus 400 to the image forming apparatus 100 by using a LAN communication of the network 1. The transmission of the sheet processing information is conducted at time such as the time of start-up of the image forming system. The image forming apparatus 100 determines items or values to be set on the operation display section 403 of the sheet processing apparatus 400 by receiving these pieces of sheet processing information from the sheet processing apparatus 400.

The start of image forming (printing) is instructed from the operator by an instruction from an operation on the operation display section 103 of the image forming apparatus 100 or by an instruction from a PC 10 through the network 1 (YES in step S403 in FIG. 20). In response to the printing instruction, the image forming apparatus 100 transmits the sheet supply information to the sheet processing apparatus 400 by a LAN communication through the network 1 (step S404 in FIG. 20, and FIG. 21(2).

The sheet supply information includes various types of information such as information on the post-processing mode (folding, stitching and the like), sheet size information, information on an adjustment value such as a stapling position, sheet type information, and information on the sheet basis weight. Based on the sheet supply information, the sheet processing apparatus 400 can determine sheet processing to be applied to a sheet conveyed from the image forming apparatus 100 and the control parameter necessary to conduct the sheet processing.

When the sheet processing operation becomes possible after the sheet processing apparatus 400 receives the above-described sheet supply information, the sheet processing apparatus 400 turns the on-line signal R0 ON in the communication path Line-P and transmits it to the image forming apparatus 100 in order to indicate that sheet processing operation becomes possible (step S405 in FIG. 20, and FIG. 21(3)).

The image forming apparatus 100 monitors the on-line signal from the sheet processing apparatus 400 through the communication path Line-P (step S406 in FIG. 20). When the image forming apparatus 100 receives the on-line signal and determines that the sheet processing apparatus 400 becomes capable of the operation (YES in step S405 in FIG. 20), the image forming apparatus 100 transmits an operation start signal indicating the operation start to the sheet processing apparatus 400 through the communication path Line-P (step S406 in FIG. 20, and FIG. 21(4)).

In the sheet processing apparatus 400 which has received the above-described operation start signal, the control section 401 initializes each section. Due to this initialization, the sheet processing apparatus 400 becomes capable of the operation (step S407 in FIG. 20)). The image forming apparatus 100 starts printing (step S408 in FIG. 20) and at the moment of discharge of the printed sheet from the image forming apparatus 100, the ON of the sheet discharge signal C2 is transmitted from the image forming apparatus 100 to the sheet processing apparatus 400 through the communication path Line-P (step S409 in FIG. 20, and FIG. 21(5)).

When the sheet processing apparatus 400 receives a sheet from the image forming apparatus 100 normally, notifies the image forming apparatus 100 of the sheet reception in response to the above-described reception of the sheet discharge signal C2. For this reason, the sheet processing apparatus 400 turns the sheet discharge signal R3 ON indicating the sheet reception in the communication path Line-P and transmits it to the image forming apparatus 100 (step S410 in FIG. 20, and FIG. 21(6)). Because of the sheet discharge signal, the number of the sheets subjected to the processing by the sheet processing apparatus 400 can be counted by the control section 101 in the image forming apparatus 100.

The image forming apparatus 100 and the sheet processing apparatus 400 repeat the above-described processing from the first page to the last page (NO□S408 in step S411 in FIG. 20). The sequence diagram in FIG. 21 shows the case of execution of printing for two sheets. To be specific, an example in which the sheet discharge signal (5) and sheet discharge signal (6) are transmitted for the first sheet, and the sheet discharge signal (7) and sheet discharge signal (8) are transmitted for the second sheet is illustrated.

Then the sheets including the last sheet printed by the image forming apparatus 100 has been sent to the sheet processing apparatus 400 and when the time for production of the booklet comes (YES in step S411 in FIG. 20), the ON of the part separation signal C3, which indicates the timing of performance of the sheet processing, is transmitted to the sheet processing apparatus 400 through the communication path Line-P (step S412 in FIG. 20, and FIG. 21(9)).

The sheet processing apparatus 400 which has received the ON of part separation signal C3, carries out the designated sheet processing (for example, production of a saddle stitched booklet) as a finishing processing (step S413 in FIG. 20). The sheet processing apparatus 400 loads the produced booklet or the like on the booklet loading section 460 to discharge it (refer to FIG. 2).

When a desired product (for example, a saddle stitched booklet) is made after correctly executing the designated sheet processing, the sheet processing apparatus 400 turns the bundle discharge signal R4 ON and transmits it to the image forming apparatus 100 through the communication path Line-P (step S414 in FIG. 20, and FIG. 21(10)).

As described above, in an image forming system which includes at least an image forming apparatus 100 which forms an image on a sheet as an upstream apparatus and a sheet processing apparatus 400 which applies sheet processing to the sheet as a downstream apparatus, an exclusive communication path (line-P) which communicates in a state where the communication partner is fixed between the upstream apparatus and downstream apparatus and a general-purpose communication path (a network 1 of a LAN communication) which communicates in a state where the communication partner is selectable between the upstream apparatus and downstream apparatus are connected. By controlling to provide the exclusive communication and the general-purpose communication with information which is manageable by the communication path respectively for transmission by sharing the information, information whose transmission is restricted in the exclusive communication path can be transmitted through the general-purpose communication path. Therefore, even when the sheet processing apparatus 400 as an apparatus of a different type is connected as a downstream apparatus, the operation state can be improved without restrictions.

For signals whose timings are important for such as for the sheet supply and sheet discharge, performance by the exclusive communication path (Line-P) instead of the network 1 of a LAN communication secures information communication with excellent real-time performance and secures a certain operation matching various timings as an image forming system.

As described above, information which cannot be handled in the parallel communication is handled by the LAN communication and signals related to timings for the sheet conveyance is handled by the parallel communication. Due to this, operations for the mode setting respectively on the image forming apparatus 100 and the sheet processing apparatus 400 are not necessary and a user-friendly image forming system can be constituted for the operators.

[Structure of the Image Forming System (4)]

For the positioning and structure of the image forming apparatus and sheet processing apparatus of the image forming system in the above description, an example is described and various modifications can be possible.

According to the structures of image forming systems (1) and (2), the image forming apparatus 100, the sheet processing apparatus 300 and the sheet processing apparatus 400 are connected in series but the structure is not limited to this.

For example, an image forming system where the image forming apparatus 100 and multiple sheet processing apparatuses 300 and the sheet processing apparatus 400 are connected in series can be included in the structure. In this case, the image forming apparatus 100, the sheet processing apparatus 300 other than the rearmost sheet processing apparatus 300 and the preceding stage side of the rearmost sheet processing apparatus 300 are connected with the communication path Line-S of the serial communication, and the subsequent stage side of the rearmost sheet processing apparatus 300 and the sheet processing apparatus 400 are connected with the communication path Line-P of the parallel communication. Further, the image forming apparatus 100 and the sheet processing apparatus 400 are connected with the network 1 of a LAN communication. Even in such an image forming system, operations similar to ones in the above operational description are possible.

To be specific, the image forming apparatus 100 and multiple sheet processing apparatuses 300 communicate necessary information through the first exclusive communication path Line-S. The image forming apparatus 100 communicates minimum necessary information with the sheet processing apparatus 400 through the sheet processing apparatus 300 and the second exclusive communication path Line-P. Another information is communicated through the network 1 as a general-purpose communication path between the image forming apparatus 100 and the sheet processing apparatus 400. Thus, even in an image forming system where an apparatus of a different type is connected as the sheet processing apparatus 400 with the upstream apparatuses (the image forming apparatus 100 and the sheet processing apparatus 300), the operation state can be improved without restrictions.

Here, the case where information on the sheet processing is transmitted from the sheet processing apparatus 400 to the image forming apparatus 100 of an upstream apparatus through the network 1 as a general-purpose communication path is considered. In this case, the image forming apparatus 100 transmits the first processing information to the sheet processing apparatus 400 through the network 1 as a general-purpose communication path. The image forming apparatus 100 transmits the second processing information including the first processing information to the sheet processing apparatus 300 through the first exclusive communication path Line-S. The rearmost sheet processing apparatus 300 of the multiple sheet processing apparatuses 300 transmits the third processing information which is a part of the second processing information to the sheet processing apparatus 400 through the second exclusive communication path Line-P. Due to this information which the third processing information transmitted through the second exclusive communication path Line-P fails to include can be transmitted as the first processing information through the network 1 as a general-purpose communication path, and thereby even in an image forming system where an apparatus of a different type is connected as the sheet processing apparatus 400, the operation state can be improved without restrictions.

Here, the first processing information is information related to a page imposition and prohibition rule. The second processing information is information related to a sheet length, conveyance speed, basis weight, discharge timing, and sheet processing timing. The third processing information is information related to the discharge and sheet processing. Due to this, information which the third processing information transmitted through the second exclusive communication path Line-P fails to include (information related to the page imposition or prohibition rule or the like) can be transmitted as the first processing information through the network 1 as a general-purpose communication path. Therefore, even in an image forming system where an apparatus of a different type is connected as the sheet processing apparatus 400, the operation state can be improved without restrictions.

What is claimed is:

1. An image forming system comprising:

an upstream apparatus for forming an image on a sheet;

a downstream apparatus for applying sheet processing to the sheet on which the image is formed by the upstream apparatus;

an exclusive communication path for communicating information which is necessary only for an operation of each apparatus in a state in which a communication partner is fixed between the upstream apparatus and the downstream apparatus; and a general-purpose communication path for communicating information in a state in which a communication partner is selectable between the upstream apparatus and the downstream apparatus;

wherein the upstream apparatus and the downstream apparatus communicate the information by using a communication path which is the exclusive communication path or the general-purpose communication path and which can handle the information to be communicated.

2. The image forming system of claim 1, wherein the general-purpose communication path is configured to be capable of communicating information with an apparatus other than the upstream apparatus and the downstream apparatus when the apparatus is connected with the path, as well as communicating information which is necessary for operations of the upstream apparatus and the downstream apparatus.

3. The image forming system of claim 1, wherein the upstream apparatus comprises:

an image forming apparatus which forms an image on a sheet; and a sheet processing apparatus which applies sheet processing to the sheet on which the image is formed by the image forming apparatus and which is connected with the downstream apparatus as a preceding stage of the downstream apparatus, wherein the exclusive communication path comprises:

a first exclusive communication path for communicating between the image forming apparatus and the sheet processing apparatus, and a second exclusive communication path for communicating between the sheet processing apparatus and the downstream apparatus, and wherein the general-purpose communication path is configured to communicate between the image forming apparatus and the downstream apparatus.

4. The image forming system of claim 3, wherein information transmitted through the first exclusive communication path includes at least information which is transmitted through the second exclusive communication path, and wherein information transmitted through the general-purpose communication path includes information which is transmitted through the first exclusive communication path and further includes another information.

5. The image forming system of claim 3, wherein the first exclusive communication path is configured to transmit information by a serial communication and the second exclusive communication path is configured to transmit information by a parallel communication.

6. The image forming system of claim 3, wherein the sheet processing apparatus connected with the downstream apparatus through the second exclusive communication path has a function of converting information transmitted from the image forming apparatus through the first exclusive communication path into information to be transmitted through the second exclusive communication path to transmit it to the downstream apparatus and converting information transmitted from the downstream apparatus through the second exclusive communication path into information to be transmitted through the first exclusive communication path to transmit it to the image forming apparatus.

7. The image forming system of claim 3, wherein the upstream apparatus comprises:

a plurality of sheet processing apparatuses connected with one another in series, which are configured to include the sheet processing apparatus and which are connected with the image forming apparatus as a subsequent stage of the image forming apparatus, wherein the plurality of sheet processing apparatuses are connected with one another through the first exclusive communication path, and wherein the second exclusive communication path connects a rearmost sheet processing apparatus of the plurality of sheet processing apparatuses and the downstream apparatus.

8. The image forming system of claim 3, wherein the upstream apparatus comprises:

a plurality of sheet processing apparatuses connected with one another in series, which are configured to include the sheet processing apparatus and which are connected with the image forming apparatus as a subsequent stage of the image forming apparatus, and wherein when information on sheet processing is transmitted from the downstream apparatus to the image forming apparatus through the general-purpose communication path, the image forming apparatus transmits first processing information to the downstream apparatus through the general-purpose communication path, and transmits second processing information including the first processing information to the sheet processing apparatus through the first exclusive communication path, and wherein a rearmost sheet processing apparatus of the plurality of sheet processing apparatuses transmits third processing information which is a part of the second processing information to the downstream apparatus through the second exclusive communication path.

9. The image forming system of claim 8, wherein the first processing information is information related to a page imposition and a prohibition rule and the second processing information is information related to a sheet length, a conveyance speed, a basis weight, a discharge timing and a sheet processing timing and the third processing information is information related to a discharge and sheet processing.

10. The image forming system of claim 3, wherein when an abnormality occurs in the downstream apparatus, the downstream apparatus creates first abnormality information which indicates an occurrence of the abnormality of the downstream apparatus and transmits the first abnormality information to the sheet processing apparatus through the second exclusive communication path;

wherein the sheet processing apparatus creates second abnormality information based on a state of the downstream apparatus and the first abnormality information and transmits the second abnormality information to the image forming apparatus through the first exclusive communication path; and wherein the downstream apparatus creates third abnormality information based on a state of the abnormality of the downstream apparatus and transmits the third abnormality information to the image forming apparatus through the general-purpose communication path.

11. The image forming system of claim 10, wherein the first abnormality information is information which indicates presence and absence of an abnormality occurrence and the second abnormality information is information which is created based on the first abnormality information and the state of the apparatus, and the third abnormality information is information which includes information on the abnormality occurrence and a content of the abnormality.

12. The image forming system of claim 3, wherein the upstream apparatus stops an operation by information on a stop instruction which includes an instruction of an operation stop, which is transmitted from an external apparatus connected with the upstream apparatus through the general-purpose communication path, and wherein the downstream apparatus continues an operation by information on sheet processing transmitted from the external apparatus through the general-purpose communication path.

13. A communication control method for an image forming system, wherein an image forming system is configured to include:

an upstream apparatus for forming an image on a sheet;

a downstream apparatus for applying sheet processing to the sheet on which the image is formed by the upstream apparatus;

an exclusive communication path for communicating information which is necessary only for an operation of each apparatus in a state in which a communication partner is fixed between the upstream apparatus and the downstream apparatus; and a general-purpose communication path for communicating information in a state in which a communication partner is selectable between the upstream apparatus and the downstream apparatus, and wherein the communication control method for the image forming system comprises a step of:

communicating the information by using one of communication paths which are the exclusive communication path and the general-purpose communication path, which can handle the information to be communicated.

14. The communication control method of claim 13, wherein the general-purpose communication path communicates information with an apparatus other than the upstream apparatus and the downstream apparatus when the apparatus is connected with the path, as well as communicates information which is necessary for operations of the upstream apparatus and the downstream apparatus.

15. The communication control method of claim 13, wherein the upstream apparatus comprises:

an image forming apparatus which forms an image on a sheet; and a sheet processing apparatus which applies sheet processing to the sheet on which the image is formed by the image forming apparatus and which is connected with the downstream apparatus as a preceding stage of the downstream apparatus, wherein the exclusive communication path comprises:

a first exclusive communication path for communicating between the image forming apparatus and the sheet processing apparatus, and a second exclusive communication path for communicating between the sheet processing apparatus and the downstream apparatus, and wherein the image forming apparatus and the downstream apparatus communicate through the general-purpose communication path.

16. The communication control method of claim 15, wherein information transmitted through the first exclusive communication path includes at least information which is transmitted through the second exclusive communication path, and wherein information transmitted through the general-purpose communication path includes information which is transmitted through the first exclusive communication path and further includes another information.

17. The communication control method of claim 15, wherein the first exclusive communication path transmits information by a serial communication and the second exclusive communication path transmits information by a parallel communication.

18. The communication control method of claim 15, wherein the sheet processing apparatus connected with the downstream apparatus through the second exclusive communication path has a function of converting information transmitted from the image forming apparatus through the first exclusive communication path into information to be transmitted through the second exclusive communication path to transmit it to the downstream apparatus and converting information transmitted from the downstream apparatus through the second exclusive communication path into information to be transmitted through the first exclusive communication path to transmit it to the image forming apparatus.

19. The communication control method of claim 15, wherein the upstream apparatus comprises:

a plurality of sheet processing apparatuses connected with one another in series, which are configured to include the sheet processing apparatus and which are connected with the image forming apparatus as a subsequent stage of the image forming apparatus, wherein the plurality of sheet processing apparatuses communicate with one another through the first exclusive communication path, and wherein a rearmost sheet processing apparatus of the plurality of sheet processing apparatuses and the downstream apparatus communicate through the second exclusive communication path.

20. The communication control method of claim 15, wherein the upstream apparatus comprises:

a plurality of sheet processing apparatuses connected with one another in series, which are configured to include the sheet processing apparatus and which are connected with the image forming apparatus as a subsequent stage of the image forming apparatus, and wherein when information on sheet processing is transmitted from the downstream apparatus to the image forming apparatus through the general-purpose communication path, the image forming apparatus transmits first processing information to the downstream apparatus through the general-purpose communication path, and transmits second processing information including the first processing information to the sheet processing apparatus through the first exclusive communication path, and wherein a rearmost sheet processing apparatus of the plurality of sheet processing apparatuses transmits third processing information which is a part of the second processing information to the downstream apparatus through the second exclusive communication path.

21. The communication control method of claim 20, further comprising:

communicating information related to a page imposition and a prohibition rule as the first processing information;

communicating information related to a sheet length, a conveyance speed, a basis weight, a discharge timing and a sheet processing timing as the second processing information, and communicating information related to a discharge and sheet processing as the third processing information.

22. The communication control method of claim 15, wherein when an abnormality occurs in the downstream apparatus, the downstream apparatus creates first abnormality information which indicates an occurrence of the abnormality of the downstream apparatus and transmits the first abnormality information to the sheet processing apparatus through the second exclusive communication path; and wherein the sheet processing apparatus creates second abnormality information based on a state of the downstream apparatus and the first abnormality information and transmits the second abnormality information to the image forming apparatus through the first exclusive communication path; and wherein the downstream apparatus creates third abnormality information based on a state of the abnormality of the downstream apparatus and transmits the third abnormality information to the image forming apparatus through the general-purpose communication path.

23. The communication control method of claim 22, wherein the first abnormality information is information which indicates presence and absence of an abnormality occurrence and the second abnormality information is information which is created based on the first abnormality information and the state of the apparatus, and the third abnormality information is information which includes information on the abnormality occurrence and a content of the abnormality.

24. The communication control method of claim 15, wherein the upstream apparatus stops an operation by information on a stop instruction which includes an instruction of an operation stop, which is transmitted from an external apparatus connected with the upstream apparatus through the general-purpose communication path, and wherein the downstream apparatus continues an operation by information on sheet processing transmitted from the external apparatus through the general-purpose communication path.

* * * * *